US011440645B2

(12) United States Patent
Guida

(10) Patent No.: US 11,440,645 B2
(45) Date of Patent: *Sep. 13, 2022

(54) ADJUSTABLE LIFT MODIFICATION WINGTIP

(71) Applicant: Tamarack Aerospace Group, Inc., Sandpoint, ID (US)

(72) Inventor: Nicholas R. Guida, Sagle, ID (US)

(73) Assignee: Tamarack Aerospace Group, Inc., Sandpoint, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,033

(22) Filed: Feb. 14, 2020

(65) Prior Publication Data
US 2020/0298963 A1 Sep. 24, 2020

Related U.S. Application Data

(63) Continuation of application No. 14/097,122, filed on Dec. 4, 2013, now Pat. No. 10,562,613.

(51) Int. Cl.
*B64C 23/06* (2006.01)
*B64C 5/10* (2006.01)
*B64C 13/16* (2006.01)

(52) U.S. Cl.
CPC .............. *B64C 23/072* (2017.05); *B64C 5/10* (2013.01); *B64C 13/16* (2013.01); *B64C 23/076* (2017.05); *Y02T 50/10* (2013.01)

(58) Field of Classification Search
CPC ...... B64C 2001/0072; B64C 2201/021; B64C 2201/042; B64C 2201/104;
(Continued)

(56) References Cited

U.S. PATENT DOCUMENTS 994,968 A * 6/1911 Barbaudy ................. B64C 3/14
244/35 R
1,050,222 A * 1/1913 McIntosh .................. B64C 3/14
244/35 R
(Continued)

FOREIGN PATENT DOCUMENTS

CA           2450025          1/2003
GB           2282996          4/1995
(Continued)

OTHER PUBLICATIONS

The Australian Office Action dated Dec. 11, 2017 for Australian patent application No. 2014271311, a counterpart foreign application of U.S. Appl. No. 14/097,122, 3 pages.
(Continued)

*Primary Examiner* — Medhat Badawi
(74) *Attorney, Agent, or Firm* — Lee & Hayes, P.C.

(57) ABSTRACT

An adjustable lift modification wingtip may be attached to a baseline wing of an aircraft. The adjustable lift modification wingtip may comprise a horizontal portion including a control surface and a vertical portion coupled to the horizontal portion. The vertical portion may move about an axis that may be substantially perpendicular to the horizontal portion. The control surface and the vertical portion may be adjusted in conjunction to increase wing efficiency at a flight condition.

16 Claims, 11 Drawing Sheets

(58) Field of Classification Search
CPC ........ B64C 2201/127; B64C 2201/165; B64C 2203/00; B64C 23/069; B64C 39/024; B64C 3/20; A63H 27/001; B64F 5/10; Y02T 50/10; Y02T 50/164
See application file for complete search history.

(56) References Cited

U.S. PATENT DOCUMENTS

| | | | | |
|---|---|---|---|---|
| 1,692,081 A * | 11/1928 | La Cierva | B64C 27/023 | 416/131 |
| 1,710,673 A * | 4/1929 | MacDonald | B64C 3/44 | 244/215 |
| 1,803,498 A * | 5/1931 | Chilton | B64C 13/00 | 244/90 R |
| 1,841,921 A * | 1/1932 | Spiegel | B64C 23/069 | 244/199.4 |
| 2,074,201 A * | 3/1937 | Bechereau | B64C 23/06 | 244/91 |
| 2,123,096 A * | 7/1938 | Charp | B64C 23/06 | 244/35 R |
| D144,143 S * | 3/1946 | Scott | D12/332 | |
| 2,418,301 A * | 4/1947 | Charles | B64C 3/42 | 244/91 |
| 2,565,990 A * | 8/1951 | Richard | B64C 5/08 | 244/90 R |
| 2,576,981 A * | 12/1951 | Vogt | B64C 23/069 | 244/91 |
| 2,775,419 A * | 12/1956 | Hlobil | B64C 39/10 | 244/35 R |
| 2,805,830 A * | 9/1957 | Zborowski | B64C 29/0091 | 244/35 R |
| 2,846,165 A * | 8/1958 | Axelson | B64C 23/076 | 244/90 R |
| 3,029,018 A * | 4/1962 | Floyd, Jr. | G06G 7/46 | 703/9 |
| 3,107,882 A * | 10/1963 | Matteson | B64C 29/0033 | 244/7 C |
| 3,128,371 A * | 4/1964 | Spaulding | G06G 7/44 | 205/775 |
| 3,218,005 A * | 11/1965 | Alvarez | B64C 3/54 | 244/218 |
| 3,270,988 A * | 9/1966 | Cone, Jr. | B64C 23/069 | 244/35 R |
| 3,684,217 A * | 8/1972 | Kukon | B64B 1/00 | 244/36 |
| 3,734,432 A * | 5/1973 | Low | B64C 13/16 | 244/191 |
| 3,778,926 A * | 12/1973 | Gladych | A63H 27/00 | 446/66 |
| 3,840,199 A * | 10/1974 | Tibbs | B64C 23/005 | 244/207 |
| 3,845,918 A * | 11/1974 | White, Jr. | B64C 23/069 | 244/199.4 |
| 4,017,041 A * | 4/1977 | Nelson | B64C 23/072 | 244/198 |
| 4,093,160 A * | 6/1978 | Reighart, II | B64C 23/06 | 244/199.1 |
| 4,108,403 A * | 8/1978 | Finch | B64C 23/065 | 244/199.2 |
| 4,172,574 A * | 10/1979 | Spillman | B64C 23/072 | 244/199.4 |
| 4,190,219 A * | 2/1980 | Hackett | B64C 23/069 | 244/199.4 |
| 4,205,810 A * | 6/1980 | Ishimitsu | B64C 23/069 | 244/91 |
| 4,240,597 A * | 12/1980 | Ellis | B64C 23/069 | 244/35 R |
| 4,245,804 A * | 1/1981 | Ishimitsu | B64C 23/069 | 244/91 |
| 4,247,062 A * | 1/1981 | Brueckner | B64C 5/08 | 244/36 |
| 4,247,063 A * | 1/1981 | Jenkins | B64C 5/08 | 244/91 |
| D259,554 S * | 6/1981 | Parise | 244/199.4 | |
| 4,365,773 A * | 12/1982 | Wolkovitch | B64C 39/068 | 244/123.7 |
| 4,382,569 A * | 5/1983 | Boppe | B64C 23/069 | 244/199.4 |
| 4,429,844 A * | 2/1984 | Brown | B64C 3/48 | 244/219 |
| 4,444,365 A * | 4/1984 | Heuberger | B64C 39/12 | 244/48 |
| 4,455,004 A * | 6/1984 | Whitaker, Sr. | B64C 23/076 | 244/90 R |
| 4,457,479 A * | 7/1984 | Daude | B64C 5/08 | 244/203 |
| 4,541,593 A * | 9/1985 | Cabrol | B64C 39/068 | 244/45 R |
| 4,545,552 A * | 10/1985 | Welles | B64C 39/10 | 244/90 R |
| 4,595,160 A * | 6/1986 | Santos | B64C 23/069 | 244/199.4 |
| 4,598,885 A * | 7/1986 | Waitzman | B64C 23/076 | 244/13 |
| 4,605,183 A * | 8/1986 | Gabriel | B64C 3/40 | 244/46 |
| 4,667,906 A * | 5/1987 | Suarez | B64C 3/28 | 244/117 A |
| 4,671,473 A * | 6/1987 | Goodson | B64C 23/076 | 244/199.4 |
| 4,674,709 A * | 6/1987 | Welles | B64C 39/10 | 244/45 R |
| 4,714,215 A * | 12/1987 | Jupp | B64C 23/069 | 244/199.4 |
| 4,720,062 A * | 1/1988 | Warrink | B64C 9/00 | 244/90 R |
| 4,722,499 A * | 2/1988 | Klug | B64C 23/076 | 244/199.4 |
| 4,776,542 A * | 10/1988 | Van Dam | B64C 3/10 | 244/198 |
| 4,949,919 A * | 8/1990 | Wajnikonis | B63B 41/00 | 244/35 R |
| 5,039,032 A * | 8/1991 | Rudolph | B64C 3/10 | 244/35 R |
| 5,072,894 A * | 12/1991 | Cichy | B64C 5/08 | 244/91 |
| 5,100,081 A * | 3/1992 | Thomas | B64C 13/30 | 244/220 |
| 5,102,068 A * | 4/1992 | Gratzer | B64C 23/069 | 244/35 R |
| 5,156,358 A * | 10/1992 | Gerhardt | B64C 5/10 | 244/36 |
| 5,275,358 A * | 1/1994 | Goldhammer | B64C 23/069 | 244/91 |
| 5,348,253 A * | 9/1994 | Gratzer | B64C 23/069 | 244/91 |
| 5,407,150 A * | 4/1995 | Sadleir | B64C 29/0025 | 244/12.4 |
| 5,407,153 A * | 4/1995 | Kirk | B64C 23/069 | 244/199.4 |
| 5,634,613 A * | 6/1997 | McCarthy | B64C 23/069 | 244/199.1 |
| 5,899,409 A * | 5/1999 | Frediani | B64C 39/068 | 244/13 |
| 5,961,068 A * | 10/1999 | Wainfan | B64C 3/10 | 244/130 |
| 5,988,563 A * | 11/1999 | Allen | B64C 3/56 | 244/49 |
| 5,992,793 A * | 11/1999 | Perry | B64C 27/463 | 244/17.11 |
| 6,042,059 A * | 3/2000 | Bilanin | B64C 23/06 | 244/199.1 |
| 6,089,502 A * | 7/2000 | Herrick | B64C 23/069 | 244/35 R |
| 6,161,797 A * | 12/2000 | Kirk | B64D 33/06 | 244/1 N |

(56) References Cited

U.S. PATENT DOCUMENTS

| | | | | |
|---|---|---|---|---|
| 6,227,487 B1 * | 5/2001 | Clark | B64C 23/072 | 244/99.12 |
| 6,260,809 B1 * | 7/2001 | Egolf | B64C 27/463 | 244/17.11 |
| 6,297,486 B1 * | 10/2001 | Rom | F42B 10/44 | 102/385 |
| 6,345,790 B1 * | 2/2002 | Brix | B64C 23/076 | 244/199.4 |
| 6,394,397 B1 * | 5/2002 | Ngo | B64C 27/463 | 244/199.3 |
| 6,422,518 B1 * | 7/2002 | Stuff | B64C 23/06 | 244/199.2 |
| 6,474,604 B1 * | 11/2002 | Carlow | B64C 39/062 | 244/198 |
| 6,484,968 B2 * | 11/2002 | Felker | B64C 23/069 | 244/91 |
| 6,547,181 B1 * | 4/2003 | Hoisington | B60V 1/08 | 244/46 |
| 6,578,798 B1 * | 6/2003 | Dizdarevic | B64C 23/069 | 244/199.1 |
| 6,722,615 B2 * | 4/2004 | Heller | B64C 23/069 | 244/199.4 |
| 6,726,149 B2 * | 4/2004 | Wojciechowski | B64C 3/00 | 244/119 |
| 6,766,981 B2 * | 7/2004 | Volk | B64C 9/32 | 244/76 C |
| 6,827,314 B2 * | 12/2004 | Barriety | B64C 3/52 | 244/201 |
| 6,886,778 B2 * | 5/2005 | McLean | B64C 3/10 | 244/45 R |
| 6,923,404 B1 * | 8/2005 | Liu | B64C 5/12 | 244/46 |
| 6,926,345 B2 * | 8/2005 | Ortega | B62D 35/008 | 296/180.4 |
| 7,048,228 B2 * | 5/2006 | Vassberg | B64C 3/28 | 244/35 R |
| 7,207,526 B2 * | 4/2007 | McCarthy | B64C 23/072 | 244/199.4 |
| 7,275,722 B2 * | 10/2007 | Irving | B64C 23/072 | 244/201 |
| 7,316,371 B2 * | 1/2008 | Wyrembek | B64C 9/32 | 244/91 |
| 7,475,848 B2 * | 1/2009 | Morgenstern | B64C 5/02 | 244/35 R |
| D595,211 S * | 6/2009 | Cazals | D12/345 | |
| 7,597,285 B2 * | 10/2009 | Schweiger | B64C 27/615 | 244/75.1 |
| 7,644,892 B1 * | 1/2010 | Alford, Jr. | B64C 23/065 | 244/199.4 |
| 7,744,038 B2 * | 6/2010 | Sankrithi | B64C 23/076 | 244/199.4 |
| 7,900,876 B2 * | 3/2011 | Eberhardt | B64C 23/069 | 244/199.4 |
| 7,900,877 B1 * | 3/2011 | Guida | B64C 13/16 | 244/199.4 |
| 7,922,115 B2 * | 4/2011 | Colgren | B64C 39/024 | 244/13 |
| 7,971,832 B2 * | 7/2011 | Hackett | B64C 3/10 | 244/199.4 |
| 7,980,515 B2 * | 7/2011 | Hunter | B64C 23/069 | 244/198 |
| 7,988,099 B2 * | 8/2011 | Bray | B64C 13/16 | 244/199.4 |
| 7,988,100 B2 * | 8/2011 | Mann | B64C 23/069 | 244/199.4 |
| 7,997,875 B2 * | 8/2011 | Nanukuttan | F03D 1/065 | 416/237 |
| 8,123,160 B2 * | 2/2012 | Shepshelovich | B64C 39/028 | 244/45 R |
| 8,241,002 B2 * | 8/2012 | Wobben | F03D 1/0675 | 416/228 |
| 8,366,056 B2 * | 2/2013 | Garang | B64C 23/069 | 244/199.4 |
| 8,382,041 B1 * | 2/2013 | Yechout | B64C 23/069 | 244/199.4 |
| 8,439,313 B2 * | 5/2013 | Rawdon | B64C 23/069 | 244/199.4 |
| 8,490,925 B2 * | 7/2013 | Buescher | B64C 23/069 | 244/199.4 |
| 8,544,800 B2 * | 10/2013 | Stuhr | B64C 23/069 | 244/199.4 |
| 8,651,427 B1 * | 2/2014 | Malachowski | B64C 23/065 | 244/199.4 |
| 8,651,431 B1 * | 2/2014 | White | B64C 23/076 | 244/218 |
| 8,727,285 B2 * | 5/2014 | Theurich | B64C 23/069 | 244/199.4 |
| 8,757,555 B2 * | 6/2014 | Werthmann | B64C 23/072 | 244/199.4 |
| 8,788,122 B1 * | 7/2014 | Sankrithi | G05D 1/0066 | 701/3 |
| 8,894,018 B2 * | 11/2014 | Boer | B64C 23/072 | 244/199.4 |
| 8,936,219 B2 * | 1/2015 | Roman | B64C 3/58 | 244/199.4 |
| 8,944,386 B2 * | 2/2015 | Gratzer | B64C 23/065 | 244/199.4 |
| 9,033,282 B2 * | 5/2015 | Wright | B64C 23/069 | 244/199.4 |
| D732,657 S * | 6/2015 | Peterson | D23/413 | |
| 9,047,794 B2 * | 6/2015 | Edmond | G09F 21/10 | |
| 9,162,755 B2 * | 10/2015 | Guida | B64C 23/069 | |
| 9,193,445 B2 * | 11/2015 | Wright | B64C 23/065 | |
| 9,199,726 B2 * | 12/2015 | Sankrithi | B64C 13/16 | |
| 9,199,727 B2 * | 12/2015 | Wright | B64C 23/069 | |
| 9,302,766 B2 * | 4/2016 | Gratzer | B64C 23/069 | |
| 9,381,999 B2 * | 7/2016 | Gratzer | B64C 3/10 | |
| 9,394,047 B2 * | 7/2016 | Herzberger | B64C 35/006 | |
| 9,446,837 B2 * | 9/2016 | Wildschek | B64C 13/16 | |
| 9,567,066 B2 * | 2/2017 | Guida | B64C 23/076 | |
| 9,845,159 B2 * | 12/2017 | Suciu | F02K 1/54 | |
| 9,919,796 B2 * | 3/2018 | Giovenga | B64C 3/385 | |
| 10,059,461 B2 * | 8/2018 | O'Kell | B64D 45/00 | |
| 10,287,002 B2 * | 5/2019 | Guida | B64C 23/069 | |
| D858,421 S * | 9/2019 | Von Holzhausen | D12/345 | |
| 10,562,613 B2 * | 2/2020 | Guida | B64C 13/16 | |
| 10,710,702 B2 * | 7/2020 | Davis | B64C 3/48 | |
| 2002/0003190 A1 * | 1/2002 | Sankrithi | B64C 39/04 | 244/119 |
| 2004/0061029 A1 | 4/2004 | McCarthy | | |
| 2004/0155157 A1 | 8/2004 | Bray | | |
| 2005/0173592 A1 * | 8/2005 | Houck, II | B64C 39/066 | 244/45 R |
| 2005/0184196 A1 * | 8/2005 | Shmilovich | B64C 23/065 | 244/199.3 |
| 2006/0027703 A1 * | 2/2006 | Bussom | B64C 27/463 | 244/17.13 |
| 2007/0018037 A1 * | 1/2007 | Perlo | B64C 39/08 | 244/45 R |
| 2007/0114327 A1 * | 5/2007 | Dees | B64C 13/16 | 244/34 R |
| 2007/0131821 A1 * | 6/2007 | Johan | B64C 5/08 | 244/91 |
| 2008/0042013 A1 * | 2/2008 | Shmilovich | B64C 23/065 | 244/199.4 |
| 2008/0116322 A1 * | 5/2008 | May | B64C 23/076 | 244/199.4 |
| 2008/0308683 A1 | 12/2008 | Sankrithi et al. | | |
| 2009/0065632 A1 * | 3/2009 | Cazals | B64D 27/16 | 244/15 |
| 2009/0084904 A1 * | 4/2009 | Detert | B64C 23/065 | 244/199.4 |
| 2009/0127861 A1 * | 5/2009 | Sankrithi | F03D 5/02 | 290/54 |
| 2009/0200431 A1 * | 8/2009 | Konings | B64C 23/072 | 244/213 |
| 2009/0224107 A1 * | 9/2009 | McLean | B64C 23/069 | 244/199.4 |

(56) References Cited

U.S. PATENT DOCUMENTS

| | | | |
|---|---|---|---|
| 2009/0256029 A1* | 10/2009 | Malachowski | B64C 23/069 244/199.4 |
| 2009/0292405 A1* | 11/2009 | Najmabadi | B64C 13/16 701/3 |
| 2009/0302167 A1* | 12/2009 | Desroche | B64C 9/18 244/199.4 |
| 2010/0006706 A1* | 1/2010 | Breitsamter | B64C 23/076 244/199.3 |
| 2010/0084516 A1* | 4/2010 | Eberhardt | B64C 23/072 244/218 |
| 2010/0123047 A1* | 5/2010 | Williams | B64C 3/16 244/35 R |
| 2010/0163669 A1* | 7/2010 | Im | B64C 3/10 244/36 |
| 2010/0163670 A1* | 7/2010 | Dizdarevic | B64C 39/12 244/36 |
| 2010/0243795 A1* | 9/2010 | McDonnell | B64C 3/10 244/36 |
| 2011/0024556 A1* | 2/2011 | Cazals | B64C 23/076 244/99.12 |
| 2011/0024573 A1* | 2/2011 | Kirk | B64C 23/069 244/199.4 |
| 2011/0192933 A1 | 8/2011 | Guering et al. | |
| 2012/0049010 A1* | 3/2012 | Speer | B64C 23/065 244/45 R |
| 2012/0112005 A1* | 5/2012 | Chaussee | B64C 23/072 244/123.1 |
| 2012/0187251 A1 | 7/2012 | Guida | |
| 2012/0286102 A1* | 11/2012 | Sinha | B64C 29/0025 244/7 B |
| 2013/0001367 A1 | 1/2013 | Boer et al. | |
| 2013/0277504 A1* | 10/2013 | Heller | B64C 23/069 244/35 R |
| 2014/0306067 A1 | 10/2014 | Guida | |
| 2015/0041597 A1* | 2/2015 | Theurich | B64C 23/069 244/199.4 |
| 2015/0048215 A1* | 2/2015 | McGinnis | B64C 39/068 244/90 R |
| 2015/0151831 A1* | 6/2015 | Guida | B64C 23/069 244/199.4 |
| 2015/0158578 A1 | 6/2015 | Guida | |
| 2015/0239549 A1* | 8/2015 | Wright | B64C 23/065 244/199.4 |
| 2016/0009378 A1* | 1/2016 | Guida | B64C 13/16 244/199.4 |
| 2016/0152318 A1* | 6/2016 | Alexander | B64D 27/18 244/13 |
| 2016/0176506 A1* | 6/2016 | Cross | F03D 1/0633 416/1 |
| 2016/0244146 A1* | 8/2016 | Harding | B64C 3/56 |
| 2017/0057621 A1* | 3/2017 | Evulet | B64C 39/024 |
| 2017/0137110 A1* | 5/2017 | Harding | B64C 13/28 |
| 2017/0137111 A1* | 5/2017 | Harding | B64C 3/56 |
| 2017/0152021 A1* | 6/2017 | Guida | B64C 13/16 |

FOREIGN PATENT DOCUMENTS

| | | |
|---|---|---|
| JP | 2010503571 | 10/2006 |
| JP | 2008536742 | 9/2008 |
| JP | 2008540240 | 11/2008 |
| WO | WO9511159 | 4/1995 |
| WO | WO2006111272 | 10/2006 |
| WO | WO2006122826 | 11/2006 |
| WO | WO2008031620 | 3/2008 |
| WO | WO2011070532 | 6/2011 |

OTHER PUBLICATIONS

The European Office Action dated Apr. 29, 2016 for European Patent Application No. 14196292.8, a counterpart foreign application of U.S. Appl. No. 14/097,122, 5 pages.

The Extended European Search Report dated Mar. 31, 2015 for European patent application No. 14196292.8, 13 pages.

Falcao, et al., "Design and Analysis of an Adaptive Wingtip", 52nd AIAA/ASME/ASCE/AHS/ASC Structures, Structural Dynamics and Materials Conference, Apr. 4, 2011, Reston, Virginia.

JP Notice of Allowance From JP 2014-245937 dated Jun. 18, 2019.

Final Office Action dated Mar. 28, 2019 for U.S. Appl. No. 14/097,122 "Adjustable Lift Modification Wingtip" Guida, 12 pages.

Office action for U.S. Appl. No. 14/097,122, dated Jan. 6, 2017, Guida, "Adjustable Lift Modification Wingtip", 14 pages.

Office action for U.S. Appl. No. 14/097,122, dated Feb. 14, 2018, Guida, "Adjustable Lift Modification Wingtip", 14 pages.

Office action for U.S. Appl. No. 14/097,122, dated May 23, 2016, Guida, "Adjustable Lift Modification Wingtip", 14 pages.

Office action for U.S. Appl. No. 14/097,122, dated Jul. 13, 2017, Guida, "Adjustable Lift Modification Wingtip", 13 pages.

Office Action for U.S. Appl. No. 14/097,122, dated Sep. 7, 2018, Nicholas R. Guida, "Adjustable Lift Modification Wingtip", 13 pages.

Translated the Japanese Office Action dated Oct. 23, 2018 for Japanese patent application No. 2014-245937, a counterpart foreign application of U.S. Appl. No. 14/097,122, 9 pages.

* cited by examiner

ADJUSTABLE LIFT MODIFICATION WINGTIP

RELATED APPLICATION

This Applications claims priority to U.S. patent application Ser. No. 14/097,122, filed Dec. 4, 2013, which is incorporated herein by reference.

BACKGROUND

There exists an ever growing need in the aviation industry to increase aircraft efficiencies and reduce the amount of fossil fuels consumed. Winglets have been designed and installed on many aircraft including large multi-passenger aircraft to increase efficiency, performance, and aesthetics. Such winglets usually consist of a horizontal body portion that may attach to the end of a wing and an angled portion that may extend vertically upward from the horizontal body portion. For example, a winglet may be attached to a pre-existing wing of an aircraft to increase flight efficiency, aircraft performance, or even to improve the aesthetics of the aircraft.

However, winglets must be designed for certain flight conditions and may represent tradeoffs between performance and weight penalties. For example, this additional structure that may be required to handle the loads of the higher performance configuration may add to the overall weight of the aircraft and detracts from any efficiencies gained by addition of the winglet in the first place. Additionally, the winglets and resulting lift distribution across the wing may be optimized for only one flight condition, for example a nominal cruise condition. Optimization for one flight condition may detract from, or even eliminate, efficiencies that may be otherwise gained while the aircraft is in any other flight condition. Accordingly, there remains a need in the art for improved aircraft winglets and wingtip devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes an adjustable lift modification wingtip and methods for using the wingtip. For example, an adjustable lift modification wingtip may be attached to a baseline wing of an aircraft. The adjustable lift modification wingtip may comprise a horizontal portion including a control surface and a vertical portion coupled to the horizontal portion. The vertical portion may move about an axis that may be substantially perpendicular to the horizontal portion.

The control surface and the vertical portion may be adjusted to increase wing efficiency at a flight condition. The adjustable lift modification wingtip may include a control system for controlling motion of the control surface and the vertical portion based at least in part on flight condition data. For certain flight conditions, the adjustable lift modification wingtip may deflect the control surface down and rotate a leading edge of the vertical portion in to increase lift at a first flight condition, and deflect the control surface up and rotate the leading edge of the vertical portion out to decrease lift at a second flight condition.

Additionally or alternatively, the adjustable lift modification wingtip may use an existing control surface, for example, a flaperon, on a baseline wing and may omit the horizontal portion.

Additionally or alternatively, the vertical portion may rotate about an angled axis is substantially parallel to a vertical axis of the aircraft, the angled axis may be substantially parallel to a spanwise portion of the angled portion, an angled axis that may be out of plane with the baseline wing, or a combination thereof.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
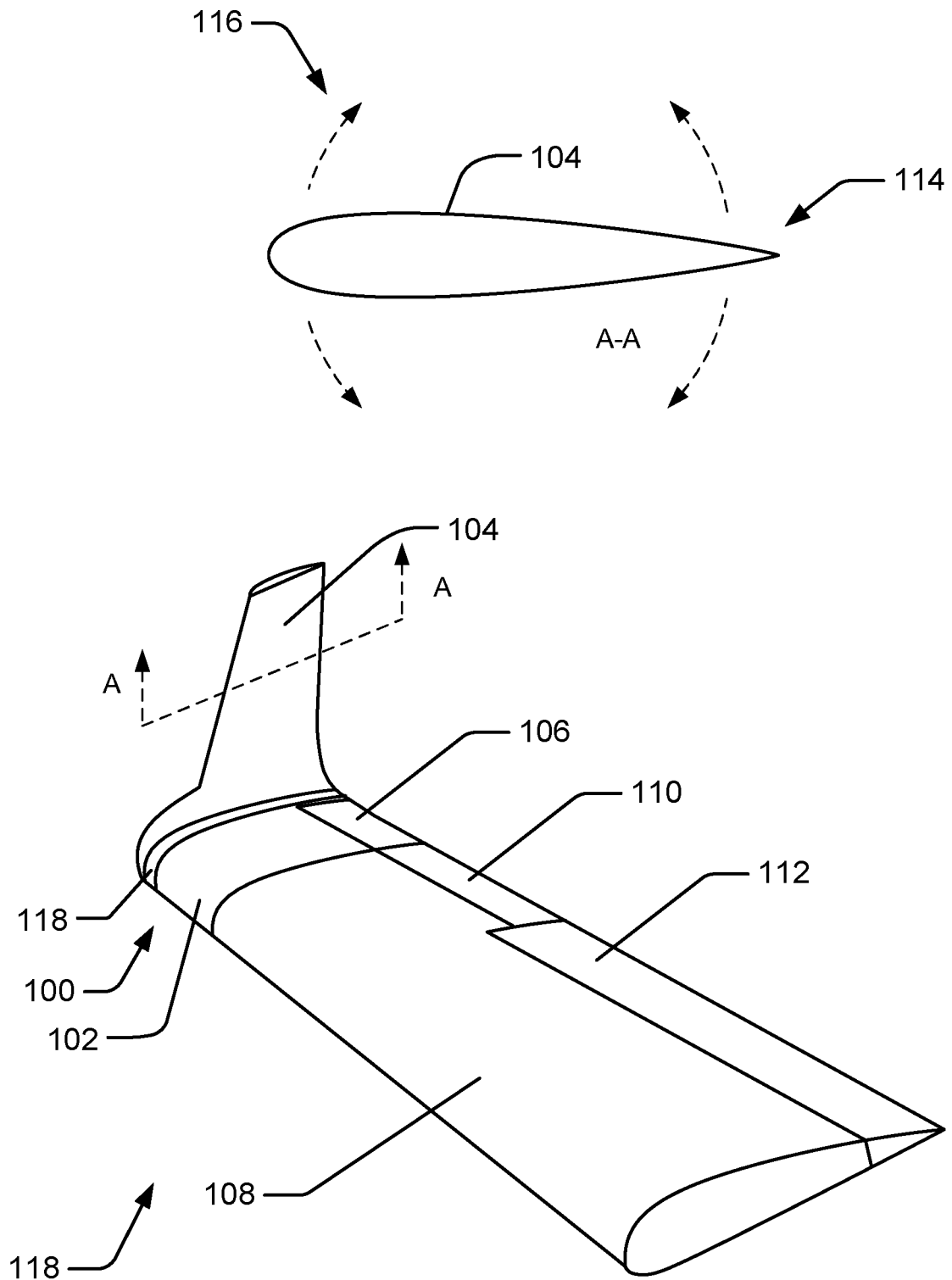
FIG. 1 depicts an illustrative adjustable lift modification wingtip attached to a wing of an aircraft.

This application describes a lift adjustable lift modification wingtip that may be used on a wing of an aircraft to increase efficiency and performance of the aircraft in various flight conditions. Adjusting a toe angle of a winglet in conjunction with deflecting control surfaces on the wing can redistribute the lift across the wing to a more efficient distribution.

Aircraft are often designed with fixed winglets that have previously been an aerodynamic compromise and cannot adjust to a particular flight condition. They balance added bending moments and cruise performance. For example, a configuration that increase cruise performance would normally increase bending moments and other load factors that require additional structure adding additional mass to an aircraft thereby reducing any increased efficiency. There is no adjustable winglet/wingtip commercially available today.

This application addresses modifying the configuration of the aircraft to gain efficiency in different phases of flight and flight conditions. For example, during flight phases that require high angles of attack (AOA), it may be more aerodynamically beneficial to have winglets with an aggressive toe-in angle while during high speed cruise and descent it may be more beneficial to have a reduced winglet toe angle (toe out angle) to reduce the effects of induced drag therefore higher obtaining a higher cruise performance.

Often induced drag may reduced by changing the airflow and spanwise distribution. For example, the wingtip airflow can be optimized and customized to have a higher efficiency for the real-time flight condition that the aircraft is experiencing. When the toe angle and deflection of the horizontal control surface are used in conjunction, depending on the flight condition, the total efficiency is greater than the sum of the parts. For example, flight testing and analytical work shows that the adjustment of the winglet toe angle alone is beneficial, and combined in real time with the deflection of a horizontal control surface, a greater benefit can be achieved. For various flight conditions, the advantage is that the combination is better by at least 5-8% over the individual parts.

The adjustable lift modification wingtip may adjust the winglet toe angle and the deflection of a horizontal control surface as the flight condition changes, including, for example, the lift coefficient and angle of attack. Often there are several wing configurations, clean, take off, climb, descent, among others. Often, for each, the high lift devices are configured (flap, slat, among others) to a particular position. These different wing configurations may cause the adjustable lift modification wingtip to adjust the winglet toe angle and the deflection of a horizontal control surface in increase efficiency in these flight configurations.

Often, when the lift Coefficient (CL) is high, the winglet may have a positive, or toe in angle and the deflection of the horizontal control surface may be high. At low CL, the toe angle may be low and the deflection of the horizontal control surface may be low, near zero, or even negative to unload the wingtip.

Illustrative Adjustable Lift Modification Wingtip

FIG. 1 depicts an illustrative adjustable lift modification wingtip. For example, an adjustable lift modification wingtip 100 may comprise a horizontal portion 102 and a vertical portion 104. The horizontal portion 102 may comprise a control surface 106. The adjustable lift modification wingtip 100 may be fixedly attachable to a wing 108 of an aircraft (not shown). Various embodiments contemplate that the wing 108 may comprise control surfaces including, but not limited to, an aileron 110, a flap 112, a flaperon, a spoiler, a spoileron, a speed brake, a leading edge device, a warpable portion, a tab, an elevator, an elevon, a controllable airflow modification device, or combinations thereof. Examples of controllable airflow modification devices may be found in U.S. Pat. No. 7,900,877 and US Patent Application Publication US20120187251. Further, the aileron 116 and the flap 118 may be used for flight control of the aircraft and in some instances may be controlled by one or more pilots of the aircraft.

Various embodiments contemplate that wing 108 may be a baseline wing of the aircraft. The baseline wing may or may not include wingtips and/or wingtip devices that may be replaced by an adjustable lift modification wingtip 100. Additionally, the adjustable lift modification wingtip 100 may be configured to couple to the structure of the baseline wing, for example, the adjustable lift modification wingtip 100 may have one or more spar extensions (not shown) that couple to one or more spars in the baseline wing.

Various embodiments contemplate that the horizontal portion 102 may be substantially horizontal with respect to the aircraft and may be substantially in alignment with the wing 108. For example, FIG. 1 shows an example where horizontal portion 102 may comprise a wing extension and substantially extend the wing 108 substantially maintaining and extending the baseline wing planform. However, various embodiments contemplate that the horizontal portion 102 may be substantially out of alignment with the wing 108 and may change the planform of the wing 108 and may include anhedral, dihedral, forward sweep, rear sweep, or a combination thereof.

Various embodiments contemplate that the vertical portion 104 may be coupled to the horizontal portion 102 where the vertical portion 104 may be configured to move about an axis that may be substantially perpendicular to the horizontal portion 102. For example, the vertical portion 104 may rotate about an axis that is substantially parallel to a vertical axis of the aircraft. Additionally or alternatively, the vertical portion 104 may rotate about an axis that is substantially perpendicular to a portion of the upper surface, lower surface, a plane defined by a chord line from the leading edge to the trailing edge, a plane defined by the mean chamber line of the wing, or a combination thereof. The vertical portion 104 may rotate about an axis that is substantially parallel to a spanwise portion of the angled portion 104. For example the axis may be substantially parallel to an axis extending through the vertical portion 104, including by way of example only, along a portion of a spar structure of the vertical portion 104. FIG. 1 also depicts, by way of example only, an illustrative cross-section 114 of the vertical portion 104. Cross-section 114 illustrates an example where the vertical portion 104 may adjust the angle at which the vertical portion 104 is aligned with the free stream direction of the aircraft.

Various embodiments contemplate that the vertical portion 104 may extend directly from the end of the wing 108 or from the horizontal portion 102. Additionally or alternatively, the vertical portion 104 may comprise an angled portion that may angle away from the horizontal portion 102. Additionally or alternatively, the vertical portion 104 may have multiple vertical or moveable surfaces that may be substantially vertical in certain configurations. Additionally or alternatively, the substantially vertical portion 104 may extend above the wing 108, below the wing 108, or a combination there of. Additionally or alternatively, the substantially vertical portion 104 may be offset from the end of the wing 108, for example as part of an outer portion of a spiroid wingtip device. Additionally or alternatively, the horizontal portion 102 and vertical portion 104, alone or in combination, may comprise at least a portion of a winglet, end-plate, spiroid, split winglet, fence, rake, swallow tail, or a combination thereof.

Additionally or alternatively, the adjustable lift modification wingtip 100 may comprise a fairing 118. The fairing 118 may provide a cover for a space between the horizontal portion 102 and the vertical portion 104 that may develop from the connecting structure and/or rotation of the vertical portion 104 with respect to horizontal portion 102. The fairing 118 may help improve efficiency, for example, by reducing drag, such as, form drag and/or interference drag.

Various embodiments contemplate that the control surface 106 and the vertical portion 104 which, when attached to the wing 108 of the aircraft, may increase wing efficiency at a flight condition. For example, the control surface 106 and vertical portion 104 may be adjusted to redistribute the spanwise lift distribution on the wing 108. The adjustment of the control surface 106 and vertical portion 104 may be adjusted in a coordinated fashion to increase the efficiency of the aircraft at a given flight condition.

FIG. 1 also depicts an illustrative modified wing 118 which may include the illustrative wing 108 coupled to the adjustable lift modification wingtip 100. The modified wing 118 may be designed and crafted for a new aircraft (e.g., with an active wing extension integrated into the aircraft during its original manufacture), or the adjustable lift modification wingtip 100 may be attached to the existing wing 108 after the manufacture. The adjustable lift modification wingtip 100 of modified wing 118 may be configured in a similar shape as the existing wing 108. Additionally, and by way of example only, the adjustable lift modification wingtip 100 may fit over a portion of the existing wing 108 such that a portion of the end of the existing wing 108 resides within an attachable portion of the adjustable lift modification wingtip 100. In that case, the attachable portion may include a sleeve or collar that fits over at least a portion of the end of the existing wing 108. In other embodiments, the adjustable lift modification wingtip 100 may additionally or alternatively be attached to the existing wing 108 by fastening the end of the existing wing 108 to the attachable portion via an abutting face and/or via an internal structural support. Further, the adjustable lift modification wingtip 100 may be fabricated of the same or similar material as the existing wing 108.

Illustrative Adjustable Lift Modification Wingtip

Figure 2:
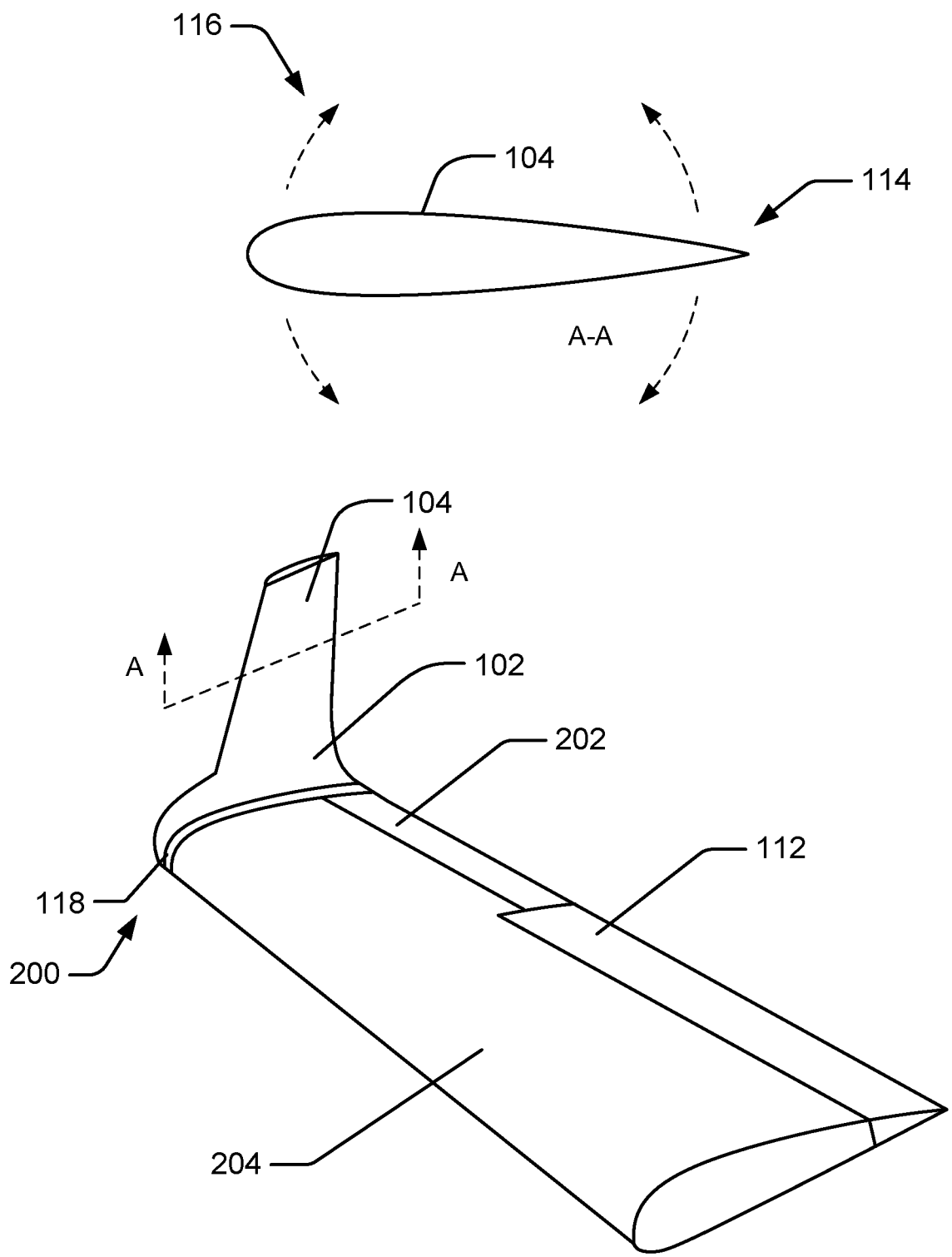
FIG. 2 depicts another illustrative embodiment of an adjustable lift modification wingtip attached to a wing of an aircraft.

FIG. 2 depicts an illustrative adjustable lift modification wingtip. For example, an adjustable lift modification wingtip 200 may comprise a vertical portion 104. The adjustable lift modification wingtip 200 may also comprise the use of a control surface 202 of the wing 204. Various embodiments contemplate that the control surface 202 may comprise a flaperon.

Various embodiments contemplate that the control surface 202 and the vertical portion 104 which, when attached to the wing 204 of an aircraft (not shown), may increase wing efficiency at a flight condition. For example, the control surface 202 and vertical portion 104 may be adjusted to redistribute the spanwise lift distribution on the wing 204. The adjustment of the control surface 202 and vertical portion 104 may be adjusted in a coordinated fashion to increase the efficiency of the aircraft at a given flight condition.

Illustrative Aircraft with Adjustable Lift Modification Wingtip

Figure 3:
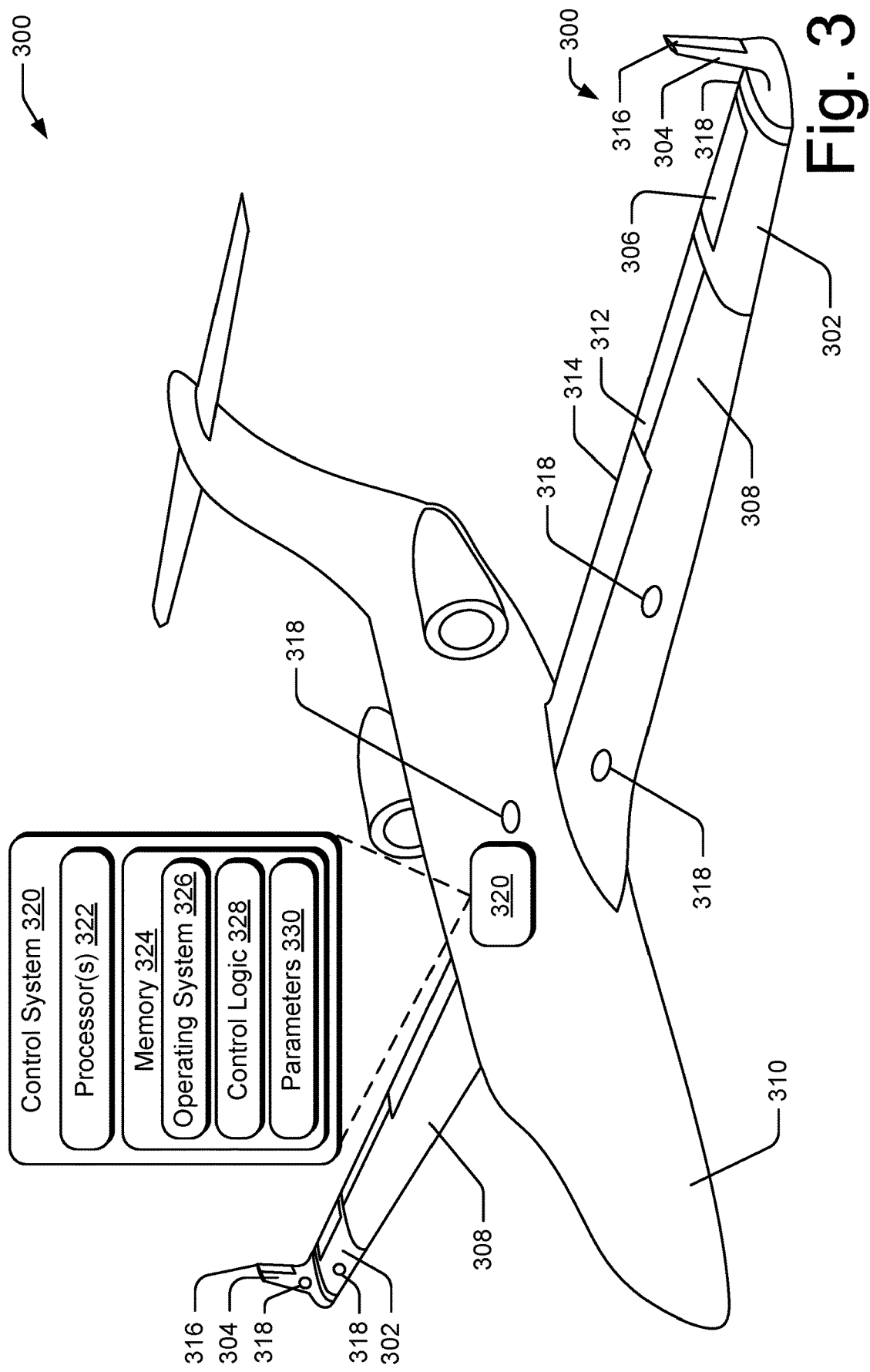
FIG. 3 depicts an aircraft with attached illustrative adjustable lift modification wingtips.

FIG. 3 depicts an illustrative adjustable lift modification wingtip. For example, an adjustable lift modification wingtip 300 may comprise a horizontal portion 302 and a vertical portion 304. The horizontal portion 302 may comprise a control surface 306. The adjustable lift modification wingtip 300 may be fixedly attachable to a wing 308 of an aircraft 310. Various embodiments contemplate that wing 308 may be a baseline wing of the aircraft. Various embodiments contemplate that the wing 308 may comprise control surfaces including, but not limited to, an aileron 312, a flap 314, a flaperon, a spoiler, a spoileron, a speed break, a leading edge device, a warpable portion, a tab, an elevator, an elevon, a controllable airflow modification device, or combinations thereof.

Various embodiments contemplate that the vertical portion 304 may be coupled to the horizontal portion 302 where the vertical portion 304 may be configured to move about an axis, for example, an axis that may be substantially perpendicular to the horizontal portion 302. Additionally or alternatively, the vertical portion 304 may comprise a vertical control surface 316, where for example, deflection of the vertical control surface 316 may cause an effect similar to a rotation of the vertical portion 304 about an axis. Additionally or alternatively, one or both of rotation of the vertical portion 304 and deflection of the vertical control surface 316 may be used.

Various embodiments contemplate that the control surface 306 and the vertical portion 304 which, when attached to the wing 308 of the aircraft 310, may increase wing efficiency at a flight condition. For example, the control surface 306 and vertical portion 304 may be adjusted to redistribute the spanwise lift distribution on the wing 308. The adjustment of the control surface 306 and vertical portion 304 may be adjusted in a coordinated fashion to increase the efficiency of the aircraft at a given flight condition.

Components of the adjustable lift modification wingtip 300 may include sensors 316, horizontal portion(s) 302, vertical portion(s) 304, a control system 318, and control surface(s) 306. By way of example only, and not limitation, FIG. 3 illustrates an adjustable lift modification wingtip 300 on each wing 308 of the aircraft 310. However, adjustable lift modification wingtip(s) 300 may also be placed on other surfaces of the aircraft 302. For example, the adjustable lift modification wingtip(s) 300 may be located on the wings, as shown, or they may be located on the tail wings, or any other horizontal or vertical surface of the aircraft 310 including the fuselage.

As mentioned above, the adjustable lift modification wingtip 300 may comprise a control system 320. The control system 320 may be configured to control the control surface(s) 306 and vertical portion(s) 304 of the aircraft 310. The control system 320 may symmetrically and/or asymmetrically control each wingtip. By way of example only, and not limitation, the control system 320 may include one or more processor(s) 322 for receiving and processing system data, including, but not limited to, flight condition data. In one embodiment, the processor(s) 322 may receive in-flight data from the sensors 318. Sensors 318 may be located anywhere on the aircraft including the wing, fuselage, wing extensions, and/or wingtip devices. The control system 320 may additionally consist of memory 324 for the storage of flight condition data. The data stored in the memory 324 may include previously received flight condition data, currently recorded (i.e., current in-flight) flight condition data, or a compilation of current in-flight data and/or previously recorded in-flight data. By way of example only, the memory 324 of the control system 320 may include an operating system 326 and control logic 328.

The operating system 324 may be responsible for operating the control system 320 by way of interfacing the data with the processor(s) 322 and providing a user interface (not shown) for interaction with one or more pilots of the aircraft 310. Additionally or alternatively, the operating system 326 may be responsible for operating the control system 320 by way of interfacing the data with the processor(s) 322 without providing a user interface and may be effectively invisible to a user, for example, a pilot. The control logic 328 of the control system 320 may be configured to operate the control surface(s) 306 and/or vertical portion(s) 304 and/or vertical control surface(s) 316. In one embodiment, the control logic 328 may control the control surface(s) 306 and/or vertical portion(s) 304 and/or vertical control surface(s) 316 based on flight condition data received from the sensor(s) 318. Additionally, parameters 330 may be stored in the memory 324. The parameters 330 may be predetermined parameters and may be used by the control logic 328 to determine operation of the control surface(s) 306 and/or vertical portion(s) 304 and/or vertical control surface(s) 316. In some embodiments, the control system 320 may operate the control surface(s) 306 and/or vertical portion(s) 304 and/or vertical control surface(s) 316 simultaneously or independently.

By way of example only, the control system 320 of FIG. 3 is illustrated in the fuselage and/or hull of the aircraft 310. However, the control system 320 can be located anywhere on the aircraft 310, including, but not limited to, the cockpit, the tail, the wing, the wing extension, wingtip devices, or the like. Additionally or alternatively, the control system 320 can be located remotely from the aircraft and communicate with the aircraft using communication systems.

Illustrative Flow Around an Aircraft with Adjustable Lift Modification Wingtips

Figure 4:
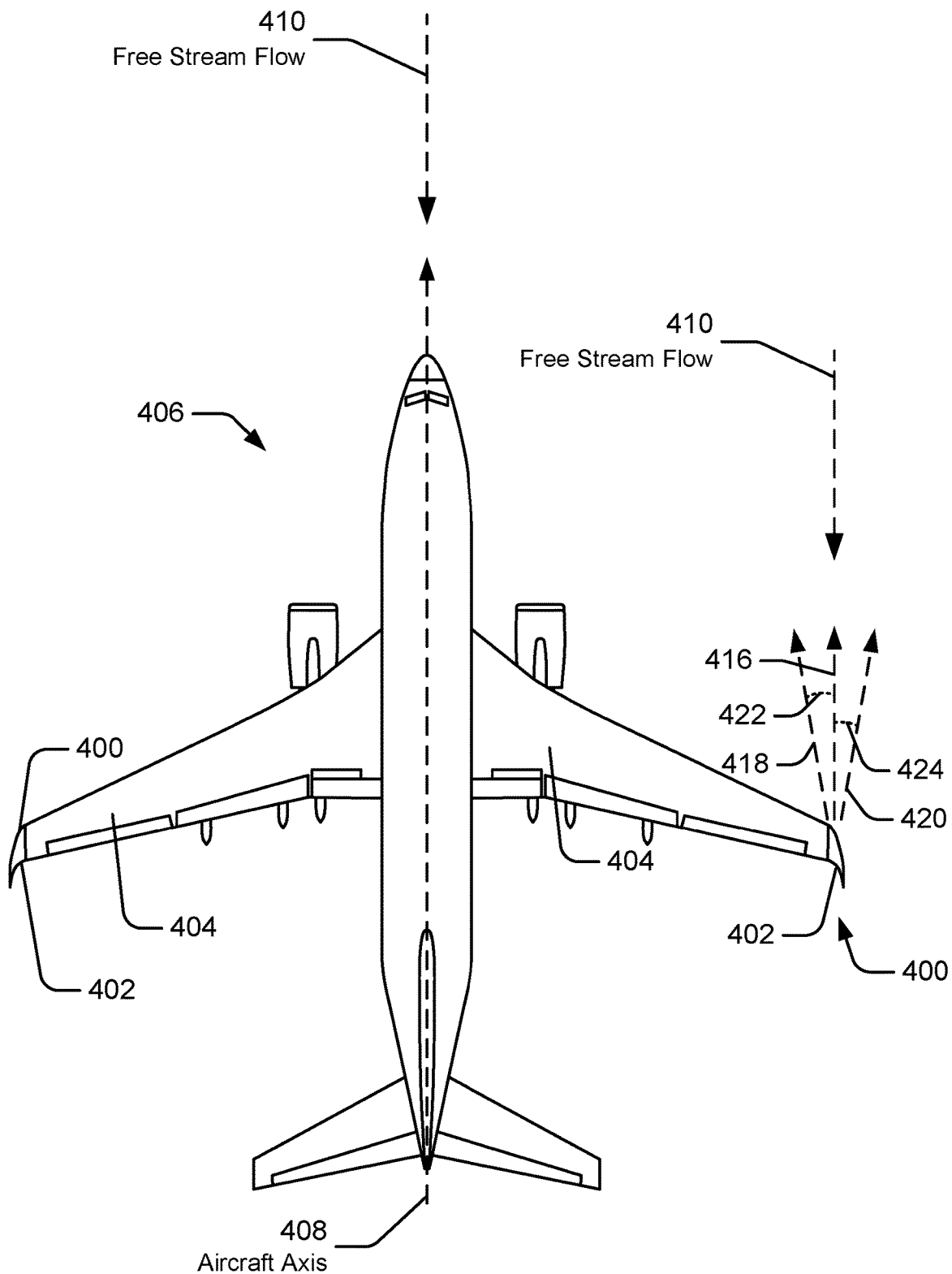
FIG. 4 depicts an aircraft with attached illustrative adjustable lift modification wingtips in an operating environment.

FIG. 4 depicts an illustrative adjustable lift modification wingtip 400 implemented with a wingtip device 402 attached to a wing 404 of an aircraft 406. By way of example only, and not limitation, FIG. 4 illustrates an adjustable lift modification wingtip 400 on each wing 404 of the aircraft 406. However, adjustable lift modification wingtip 400 may also be placed on other surfaces of the aircraft 406.

FIG. 4 also depicts arrows representative of aspects of an aircraft in various flight conditions. For example, arrow 408 represents an axis of the aircraft 406. In various embodiments arrow 408 may represent a principal axis of aircraft 406, for example a longitudinal axis. This longitudinal axis may also be substantially coplanar with a force vector that may represent thrust created by the aircraft 406.

FIG. 4 also depicts arrow 410 representative of various flows that the aircraft 406 may encounter in various flight conditions. For example, an aircraft may pass through a fluid, for example, air. By way of example and not limitation, arrow 410 may represent a vector of a free stream flow. For example, the free stream flow may comprise normal oncoming flow that the aircraft may encounter from normal flight. Additionally or alternatively, arrow 410 may represent a vector of a flow substantially out of line with the aircraft axis at arrow 408. Additionally, the arrows depicted in the figures may or may not be drawn to scale in absolute or relative magnitude.

FIG. 4 also depicts arrows 416, 418, and 420 as representative of various angles that portions of the adjustable lift modification wingtip 400 of aircraft 406 may approach in various flight conditions. By way of example and not limitation, arrow 416 may represent a toe angle of zero, arrow 418 may represent a toe in angle 422, and arrow 420 may represent a toe out angle 424.

Illustrative Adjustable Lift Modification Wingtip

Figure 5:
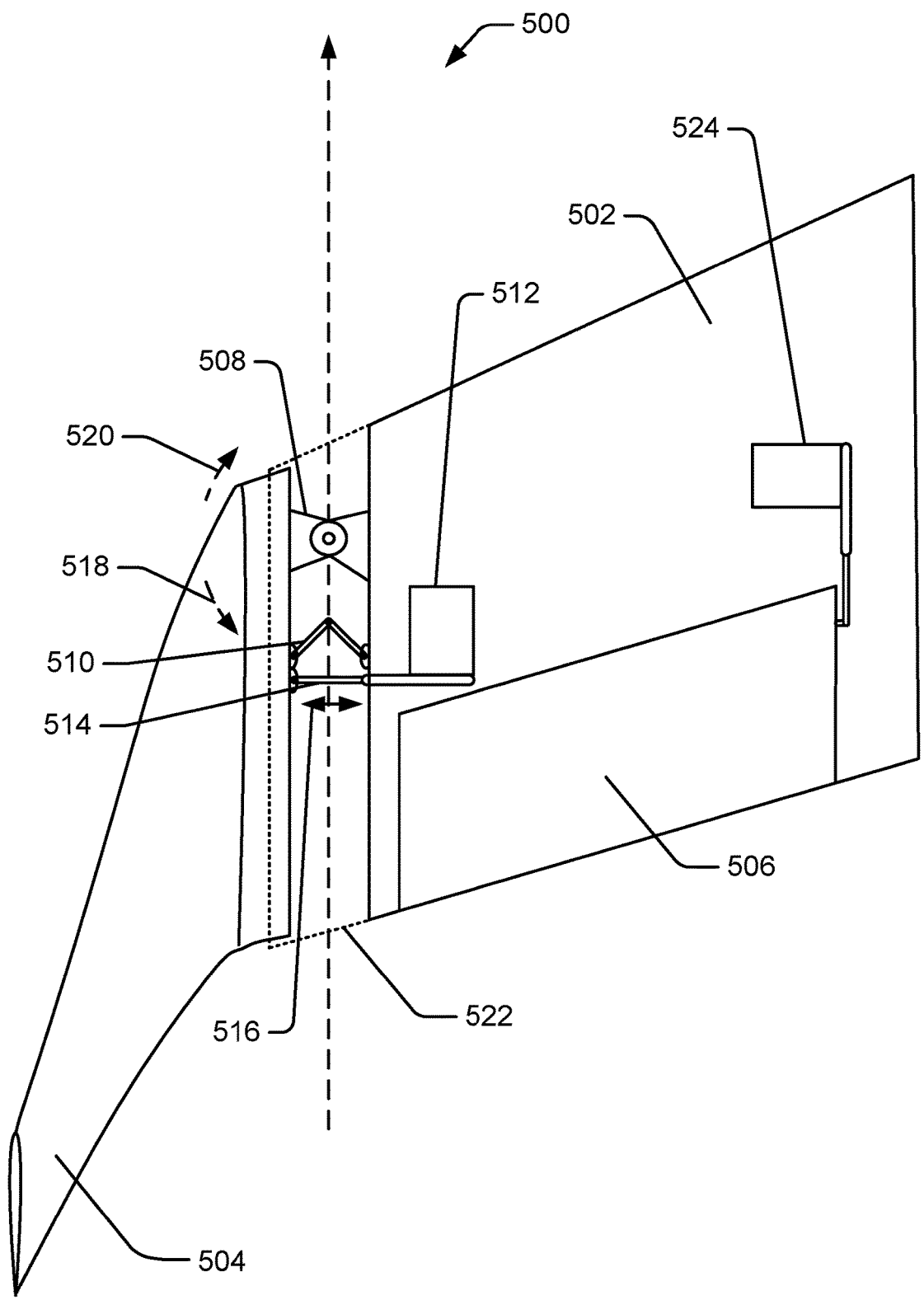
FIG. 5 depicts an illustrative adjustable lift modification wingtip attachable to a wing of an aircraft.

FIG. 5 depicts a planform view from above of an illustrative adjustable lift modification wingtip. For example, an adjustable lift modification wingtip 500 may comprise a horizontal portion 502 and a vertical portion 504. The horizontal portion 502 may comprise a control surface 506. The adjustable lift modification wingtip 500 may be fixedly attachable to a wing of an aircraft (not shown).

Various embodiments contemplate that the vertical portion 504 may be coupled to the horizontal portion 502 where the vertical portion 504 may be configured to move about an axis that may be substantially perpendicular to the horizontal portion 502. For example, the horizontal portion 502 may be coupled to the vertical portion by a hinge 508 and linkage 510. Various embodiments contemplate that hinge 508 may comprise several knuckles that overlap to form hinge 508. By way of example only, and not limitation, various embodiments contemplate that several knuckles of hinge 508 may couple to an end of the horizontal portion 502 and several knuckles of hinge 508 may couple to an end of the vertical portion 504. Various embodiments contemplate that hinge 508 may be configured to withstand bending loads and twisting loads that do not coincide with the pivoting motion of hinge 508. For example, such bending loads and twisting loads may be the result of aerodynamic loads on the horizontal portion 502 and/or the vertical portion 504. Additionally or alternatively, various embodiments contemplate that hinge 508 may be located at or near a structural spar of, an aerodynamic center of, and/or an elastic center of the horizontal portion 502 and/or vertical portion 504.

Additionally or alternatively, linkage 510 may be coupled between the horizontal portion 502 and the vertical portion 504. Various embodiments contemplate that linkage 510 may provide a translational connection between the horizontal portion 502 and the vertical portion 504. Various embodiments contemplate that linkage 510 may be configured to withstand bending loads and twisting loads that do not coincide with the pivoting motion of linkage 510. For example, such bending loads and twisting loads may be the result of aerodynamic loads on the horizontal portion 502 and/or the vertical portion 504. Additionally or alternatively, various embodiments contemplate that linkage 510 may be located fore or aft of the hinge 508.

FIG. 5 also depicts an actuation system 512 that may be controlled by the control system (not shown) to move a linkage 514 coupled to the vertical portion 504 and may move the vertical portion 504 with respect to the horizontal portion 504 about an axis defined through the hinge 508. For example, FIG. 5 also depicts arrow 516 that indicate the direction linkage 514 may move. This movement of linkage 514 may cause the vertical portion 504 to pivot with respect to the horizontal portion 502 as indicated by arrows 518 and 522. Various embodiments contemplate that that arrow 518 may indicate a movement towards a toe out or a negative toe angle configuration while arrow 520 may indicate a movement towards a toe in or a positive toe angle configuration.

FIG. 5 also depicts a fairing 522 with a dotted line. Fairing 522 may be fixedly coupled to the horizontal portion 502 and extend over a gap between the horizontal portion 502 and the vertical portion 504. This may provide coverage and protection for hinge 508, linkage 510, and linkage 514. Additionally or alternatively, as discussed above with respect to FIG. 1, various embodiments contemplate that the faring 522 may provide aerodynamic benefits as well.

FIG. 5 also depicts an actuation system 524 that may be controlled by the control system (not shown) to move the control surface 506 of horizontal portion 502 and may move the control surface 506 with respect to the horizontal portion 504.

Figure 6B:
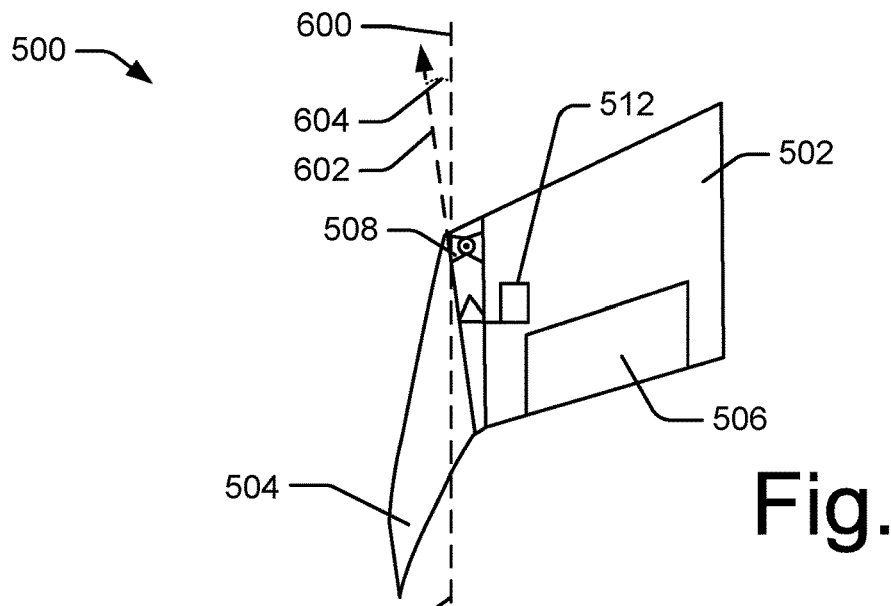
FIGS. 6A-C depict the illustrative adjustable lift modification wingtip shown in FIG. 5 in various configurations.
Figure 6A:
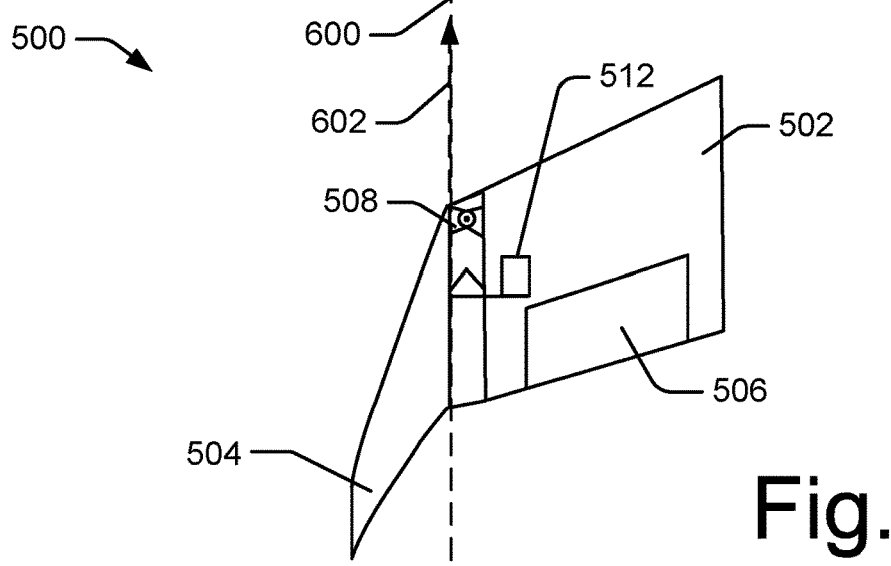
Figure 6C:
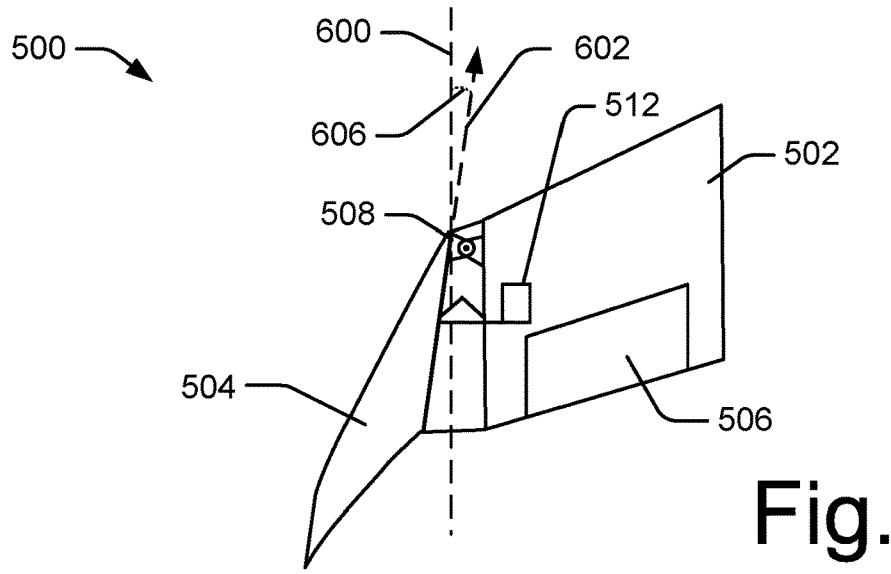

FIGS. 6A-C depict planform views from above of an illustrative adjustable lift modification wingtip as shown in FIG. 5. For example, FIG. 6A depicts the adjustable lift modification wingtip 500 comprising a horizontal portion 502 and a vertical portion 504. FIG. 6A also depicts a dashed line 600 that represents the free stream flow direction that the adjustable lift modification wingtip 500 may experience in flight. FIG. 6A also shows arrow 602 that represents the toe angle that vertical portion 504 may encounter the free stream flow as indicated by dashed line 600. FIG. 6A depicts a toe angle of the vertical portion 504 with respect to the horizontal portion 502 of near zero degrees.

FIG. 6B depicts the adjustable lift modification wingtip 500 as well as the free stream flow as indicated by dashed line 600. FIG. 6B depicts the vertical portion 504 rotated with respect to the horizontal portion 502. For example, arrow 602 representing the direction of the vertical portion 504 shows a toe angle 604 with respect to the horizontal portion 502. Various embodiments contemplate that toe angle 604 may represent a toe out or negative toe angle.

FIG. 6C depicts the adjustable lift modification wingtip 500 as well as the free stream flow as indicated by dashed line 600. FIG. 6C depicts the vertical portion 504 rotated with respect to the horizontal portion 502. For example, arrow 602 representing the direction of the vertical portion 504 shows a toe angle 606 with respect to the horizontal portion 502. Various embodiments contemplate that toe angle 606 may represent a toe in or positive toe angle.

For example, various embodiments contemplate that an adjustable lift modification wingtip may vary the toe angles 604 and 606 from a range between −10 degrees and 10 degrees. Additionally or alternatively, various embodiments contemplate various ranges of toe angles. For example, various embodiments contemplate toe angle ranges of −10 to 10 degrees, −8 to 8 degrees; −6 to 6 degrees, −4 to 4 degrees, −2 to 2 degrees, −1 to 1 degrees, or combinations thereof.

Figure 7B:
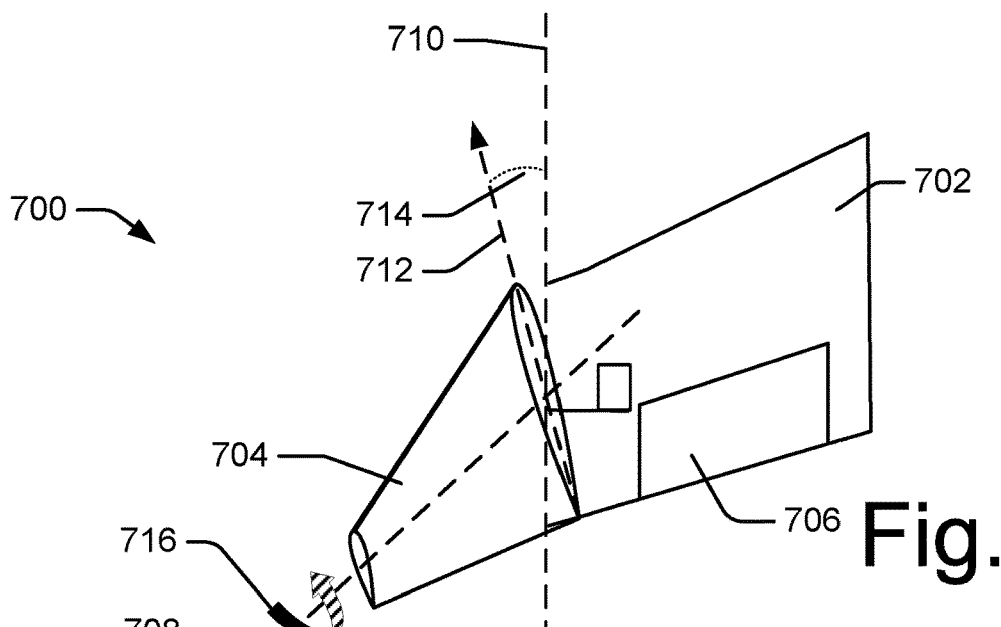
FIGS. 7A-C depict another illustrative embodiment of an adjustable lift modification wingtip in various configurations.
Figure 7A:
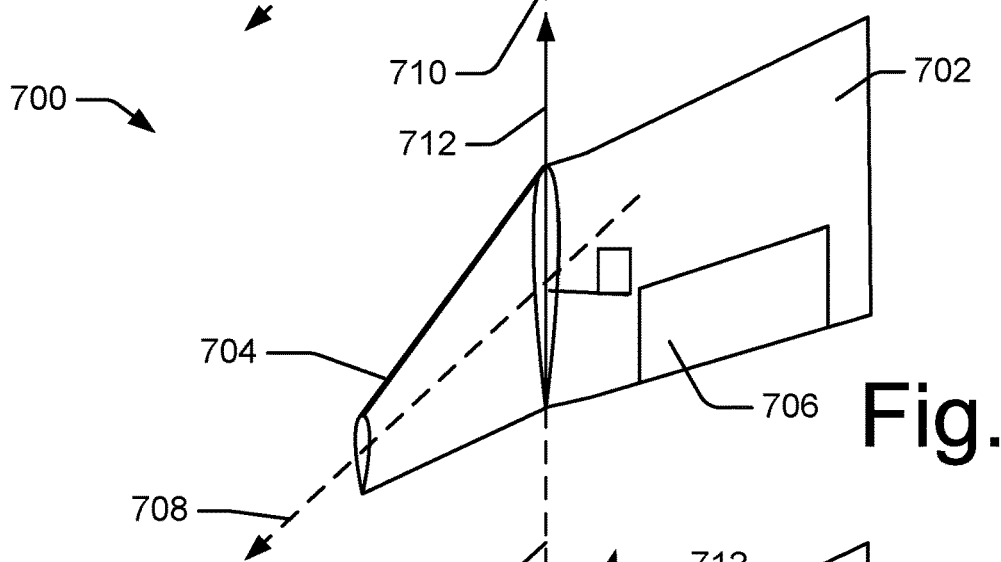
Figure 7C:
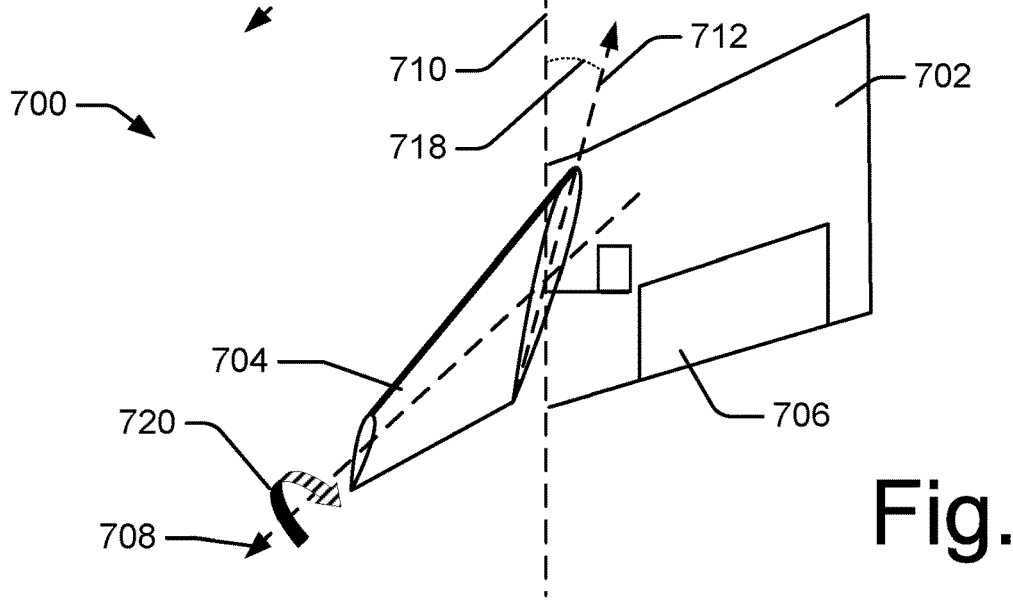

FIGS. 7A-C depict planform views from above of an illustrative adjustable lift modification wingtip. For example, FIG. 7A depicts the adjustable lift modification wingtip 700 comprising a horizontal portion 702 and a vertical portion 704. The horizontal portion 702 may comprise a control surface 706. The adjustable lift modification wingtip 700 may be fixedly attachable to a wing of an aircraft (not shown).

Various embodiments contemplate that the vertical portion 704 may be coupled to the horizontal portion 702 where the vertical portion 704 may be configured to move about an axis that may be an angled axis 708 that is out of plane with a wing of the aircraft and/or out of plane with the horizontal portion 702. Various embodiments contemplate that the angled axis 708 of rotation may be substantially parallel to a portion of the vertical portion 704. For example, the angled axis 708 may be substantially parallel to a spanwise portion of the vertical portion 704.

FIG. 7A also depicts a dashed line 710 that represents the free stream flow direction that the adjustable lift modification wingtip 700 may experience in flight. FIG. 7A also shows arrow 712 that represents the toe angle that vertical portion 704 may encounter the free stream flow as indicated by dashed line 710. FIG. 7A depicts a toe angle of the vertical portion 704 with respect to the horizontal portion 702 of near zero degrees.

FIG. 7B depicts the adjustable lift modification wingtip 700 as well as the free stream flow as indicated by dashed line 710. FIG. 7B depicts the vertical portion 704 rotated with respect to the horizontal portion 702. For example, arrow 712 representing the direction of the vertical portion 704 shows a toe angle 714 with respect to the horizontal portion 702. Various embodiments contemplate that this may be achieved by rotating vertical portion 704 about angled axis 708 in the direction as indicated by arrow 716. Various embodiments contemplate that toe angle 714 may represent a toe out or negative toe angle.

FIG. 7C depicts the adjustable lift modification wingtip 700 as well as the free stream flow as indicated by dashed line 710. FIG. 7C depicts the vertical portion 704 rotated with respect to the horizontal portion 702. For example, arrow 712 representing the direction of the vertical portion 704 shows a toe angle 718 with respect to the horizontal portion 702. Various embodiments contemplate that this may be achieved by rotating vertical portion 704 about angled axis 708 in the direction as indicated by arrow 716. Various embodiments contemplate that toe angle 718 may represent a toe in or positive toe angle.

For example, various embodiments contemplate that an adjustable lift modification wingtip may vary the toe angles 714 and 718 from a range between −10 degrees and 10 degrees. Additionally or alternatively, various embodiments contemplate various ranges of toe angles. For example, various embodiments contemplate toe angle ranges of −10 to 10 degrees, −8 to 8 degrees; −6 to 6 degrees, −4 to 4 degrees, −2 to 2 degrees, −1 to 1 degrees, or combinations thereof.

Figure 8B:
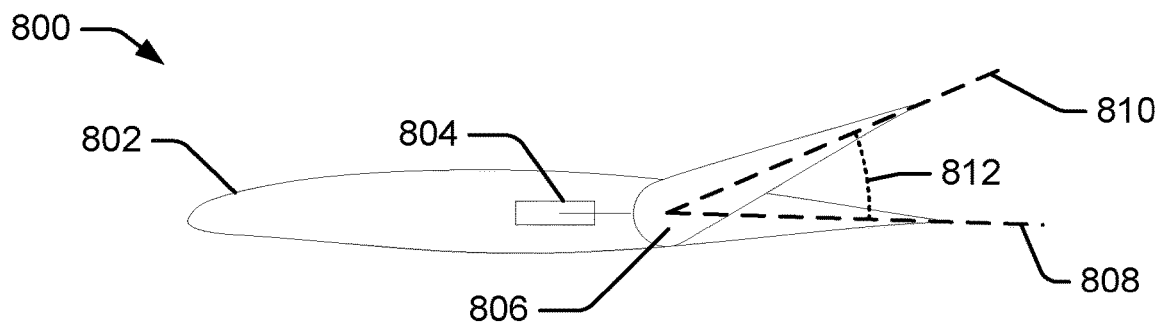
FIGS. 8A-C depict the illustrative adjustable lift modification wingtip shown in FIG. 5 in various configurations.
Figure 8A:
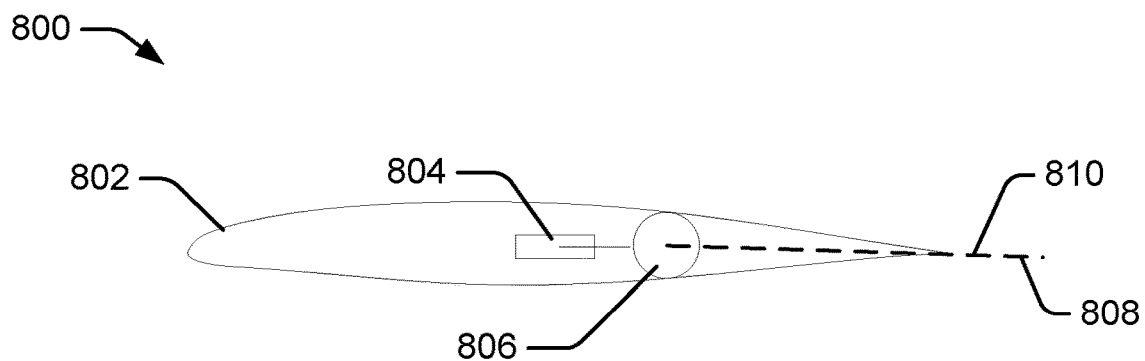
Figure 8C:
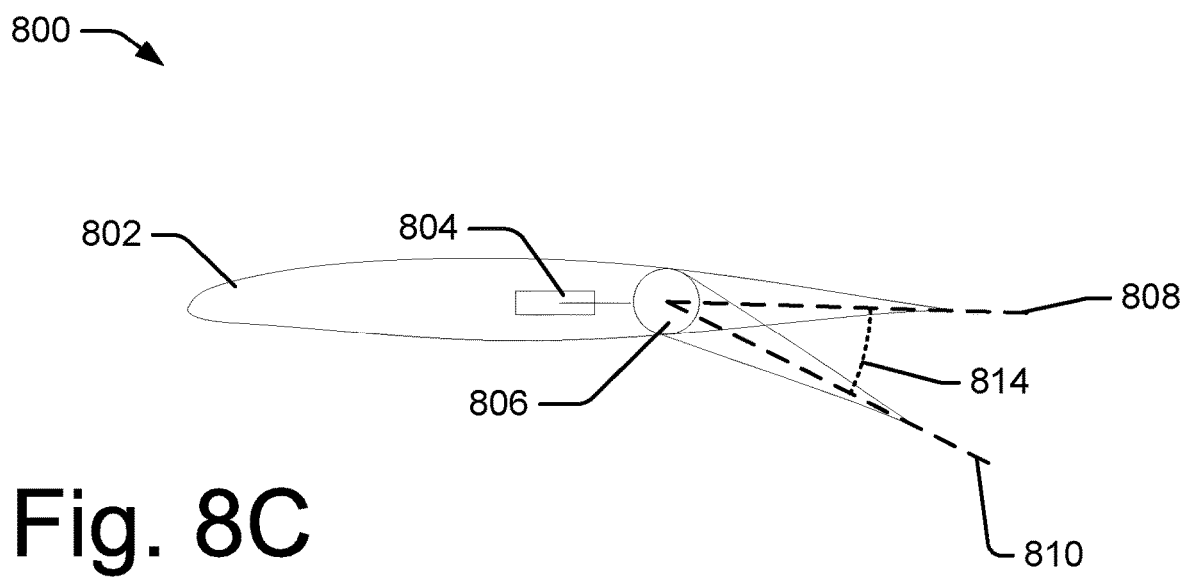

FIGS. 8A-C depict cross-sectional views of illustrative horizontal portions of an illustrative adjustable lift modification wingtip 800 attached to a wing of an aircraft (not pictured). For example, FIGS. 6A-C show illustrative horizontal portions 802 comprising an actuation system 804 coupled to a control surface 806. FIG. 8A depicts a dashed line 808 representing a midline from the trailing edge of the horizontal portion 802 to a pivot point of the control surface 806. FIG. 8A also depicts a dashed line 810 representing a midline from the trailing edge of the control surface 806 to the pivot point of the control surface 806. Various embodiments contemplate that FIG. 8A depicts a deflection or droop angle of zero degrees.

FIG. 8B depicts the adjustable lift modification wingtip 800. FIG. 8B depicts the control surface 806 deflected with respect to the horizontal portion 802. For example, dashed line 810 shows a deflection angle 812 representing a deflection of the control surface 806 from the horizontal portion 802 represented by dashed line 808. Various embodiments contemplate that deflection angle 812 may represent a negative angle of deflection and/or an upward deflection.

FIG. 8C depicts the adjustable lift modification wingtip 800. FIG. 8C depicts the control surface 806 deflected with respect to the horizontal portion 802. For example, dashed line 810 shows a deflection angle 814 representing a deflection of the control surface 806 from the horizontal portion 802 represented by dashed line 808. Various embodiments contemplate that deflection angle 814 may represent a positive angle of deflection and/or a downward deflection and/or droop angle.

Various embodiments contemplate that the control surface 806 and the vertical portion 604 which, when attached to a wing of the aircraft (not shown), may increase wing efficiency at a flight condition. For example, the control surface 806 and vertical portion 604 may be adjusted to redistribute the spanwise lift distribution on the wing. The adjustment of the control surface 806 and vertical portion 604 may be adjusted in a coordinated fashion to increase the efficiency of the aircraft at a given flight condition. Various embodiments contemplate that the control surface 806 may be adjusted to reach the needed However, various embodiments contemplate that an adjustable lift modification wingtip may vary the deflection angles 814 and 814 from a range between −15 degrees and 15 degrees. Additionally or alternatively, various embodiments contemplate various ranges of deflection angles. For example, various embodiments contemplate deflection angle ranges of −15 to 15 degrees, −10 to 10 degrees, −8 to 8 degrees, −6 to 6 degrees, −4 to 4 degrees, −4 to 8 degrees, −4 to 6 degrees, −2 to 8 degrees, −2 to 6 degrees, −2 to 4 degrees, −2 to 2 degrees, or combinations thereof.

Illustrative Comparison Graphs

Figure 9:
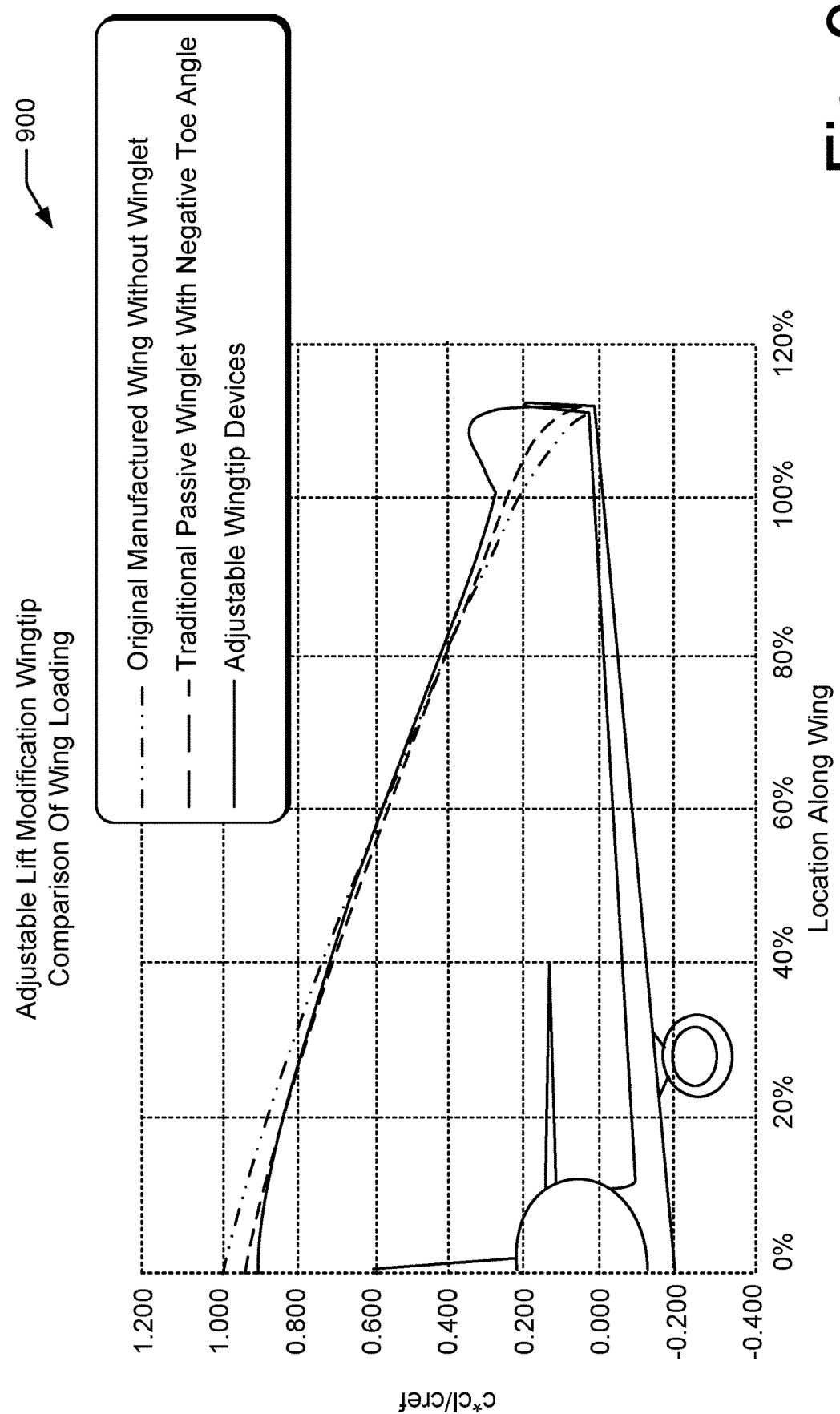
FIG. 9 depicts an illustrative chart plotting lift distribution characteristics.

FIG. 9 illustrates a graph 900 which compares the local normalized lift coefficient or lift distribution on a wing of an aircraft in relation to the location on the wing of the aircraft. The wing of FIG. 9 is a general representation of a wing and is not made representative of a specific make or model of an aircraft wing. The X-axis of the graph is illustrative of the location on the wing. It is represented in percentage (%) of the semi-span of the wing. The length of the wing is only a representation and is not limiting of the size of the wing on which an adjustable lift modification wingtip 100 may be installed. The Y-axis is representative of the lift distribution on the wing. The load is higher the closer to the center of the airplane. The graph 900 is for illustrative purposes only, and illustrates one example of the load distribution which an aircraft may experience. The graph 900 is not restrictive of whether or not the distributed load may be more or less at any point on the graph. The graph 900 is representative of the basic shape of the distributed load a wing may encounter.

The graph 900 illustrates the lift distribution on a traditional manufactured wing, which is represented by the line on the graph 900 with a dash and two dots. The graph 900 also illustrates the lift distribution on the wing when a traditional winglet with a negative toe angle is installed, which is represented by the dashed line. Additionally, the graph 900 illustrates the lift distribution on the wing when an adjustable lift modification wingtip 100 is incorporated on the wing.

The comparison illustrates that the lift distribution caused by the traditional wing with a wingtip device, for example, a winglet, may be greater at the wing root. This may move the center of lift of the wing inboard which may decrease the wings overall efficiency. However, when the wing has an adjustable lift modification wingtip 100 utilizing the control system 320 the lift distribution at the wingtip may increase significantly higher than that of a traditional winglet. This redistribution of the lift may cause an increase in the overall efficiency of the wing at a flight condition.

Additionally or alternatively, the graph displayed in FIG. 9 illustrates a flight condition where the baseline wing and standard winglet are close to optimized. Various embodiments contemplate that the illustrated ability to shift lift outboard onto the wing will allow for greater efficiency in flight conditions that are further away from the optimum flight condition that the baseline wing and standard winglet are designed for.

When the adjustable lift modification wingtip including the control surface 106 and the vertical portion 104 are undeployed (at a zero angle of deflection and negative toe angle respectively), the adjustable lift modification wingtip 100 produces the same efficiency benefits of a passive or fixed winglet. When the flight conditions change such that the passive or fixed winglet is no longer optimized, the control surface 106 and the vertical portion 104 may be deployed to increase the overall efficiency of the wing at the given flight condition.

Figure 10:
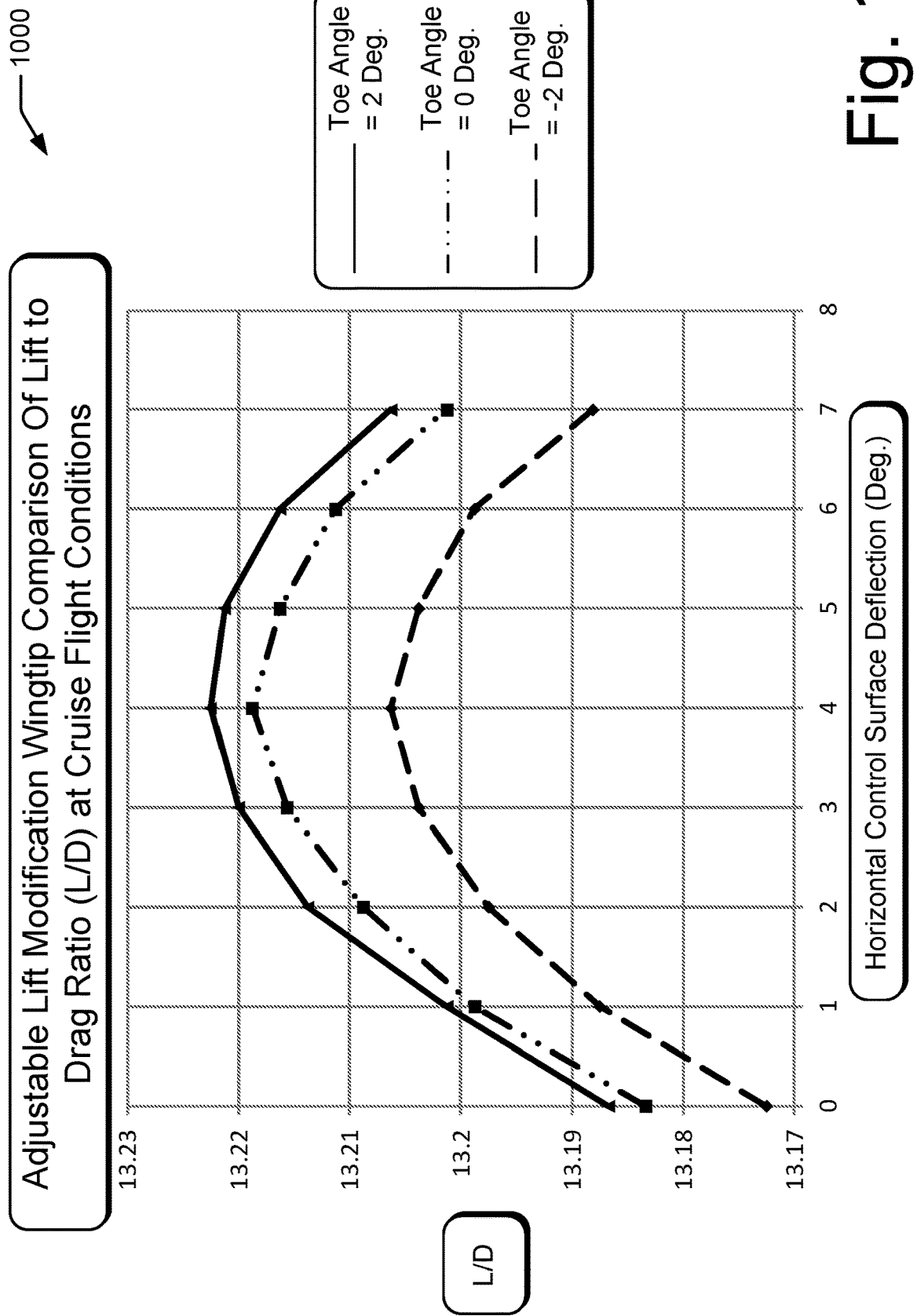
FIG. 10 depicts an illustrative chart plotting lift modification efficiency characteristics.

FIG. 10 illustrates a graph 1000 which compares the lift to drag ratio (L/D) of a wing, which may act as a proxy for efficiency of the wing. For example, if the lift to drag ratio of a wing is higher than another, with all else being equal, the wing with the higher lift to drag ratio is more efficient than the wing with the lower lift to drag ratio.

The X-axis of the graph is illustrative of the horizontal control surface deflection, for example, control surface 106. It is represented in degrees of deflection. The Y-axis is representative of the lift to drag ratio (L/D) of the wing. The graph 1000 is for illustrative purposes only, and illustrates one example of the lift to drag ratio distribution which an aircraft may experience with different configurations. The graph 1000 is not restrictive of whether or not the distributed load may be more or less at any point on the graph.

The data depicted in the graph illustrate unexpected results. For example, the combination of control surface deflection and toe angle adjustment results in a synergistic result of a larger increase in efficiency than the sum of each independent of the other. For example, in a given flight condition where the toe angle is 0 degrees and the deflection is 0 degrees, the L/D is approximately 13.183. Increasing the toe angle to 2 degrees while maintaining the deflection at 0 increases the L/D by approximately 0.0033. Increasing the deflection to 5 degrees while maintaining the toe at 0 increases the L/D by approximately 0.0329. In theory, if both the toe angle is increased from 0 to 2 degrees and the deflection is increased from 0 to 5 degrees, then the increase in L/D should be the sum of the individual parts: 0.0033+ 0.0.329=0.0363. However, when both the toe angle is increased from 0 to 2 degrees and the deflection is increased from 0 to 5 degrees, then the increase in L/D is approximately 0.0379. This results in approximately a 4.6% increase in L/D than expected.

Often commercial aircraft have set the toe angle of winglets to a fixed −2 degrees. This is often done to reduce the structure required to handle the design load of the winglet at 0 degrees. However, this is often done at the expense of an increase in efficiency.

However, various embodiments contemplate that an adjustable lift modification wingtip may vary the toe angle from a range between −2 degrees and 2 degrees. Additionally or alternatively, various embodiments contemplate various ranges of toe angles. For example, various embodiments contemplate toe angle ranges of −10 to 10 degrees, −8 to 8 degrees; −6 to 6 degrees, −4 to 4 degrees, −2 to 2 degrees, −1 to 1 degrees, or combinations thereof.

Additionally or alternatively, various embodiments contemplate that an adjustable lift modification wingtip may vary the deflection angles from a range between −15 degrees and 15 degrees. Additionally or alternatively, various embodiments contemplate various ranges of deflection angles For example, various embodiments contemplate deflection angle ranges of −15 to 15 degrees, −10 to 10 degrees, −8 to 8 degrees, −6 to 6 degrees, −4 to 4 degrees, −4 to 8 degrees, −4 to 6 degrees, −2 to 8 degrees, −2 to 6 degrees, −2 to 4 degrees, −2 to 2 degrees, or combinations thereof.

As another example of the unexpected results, in a given flight condition where the toe angle is −2 degrees and the deflection is 0 degrees, the L/D is approximately 13.173. Increasing the toe angle to 2 degrees while maintaining the deflection at 0 increases the L/D by approximately 0.0142. Increasing the deflection to 5 degrees while maintaining the toe at 0 increases the L/D by approximately 0.0313. In theory, if both the toe angle is increased from −2 to 2 degrees and the deflection is increased from 0 to 5 degrees, then the increase in L/D should be the sum of the individual parts: 0.0142+0.0.313=0.0454. However, when both the toe angle is increased from −2 to 2 degrees and the deflection is increased from 0 to 5 degrees, then the increase in L/D is approximately 0.049. This results in approximately a 7.3% increase in L/D than expected.

Additional examples are readily determinable from the graph. For example, the case where the toe angle is increased from −2 to 0 and the deflection is increased from 0 to 6 results in an unexpected increase of L/D of approximately 8.2% than expected.

In the aircraft industry, where aircraft are flown over short to long distances, incremental increases in efficiency on the order of a few percentage points, may add up to very large fuel savings over the useful life of the aircraft. For example, a few percentage points increase in efficiency for a commercial jet may result in millions of dollars of savings as well as an increase in the range of the aircraft.

Illustrative Methods

Figure 11:
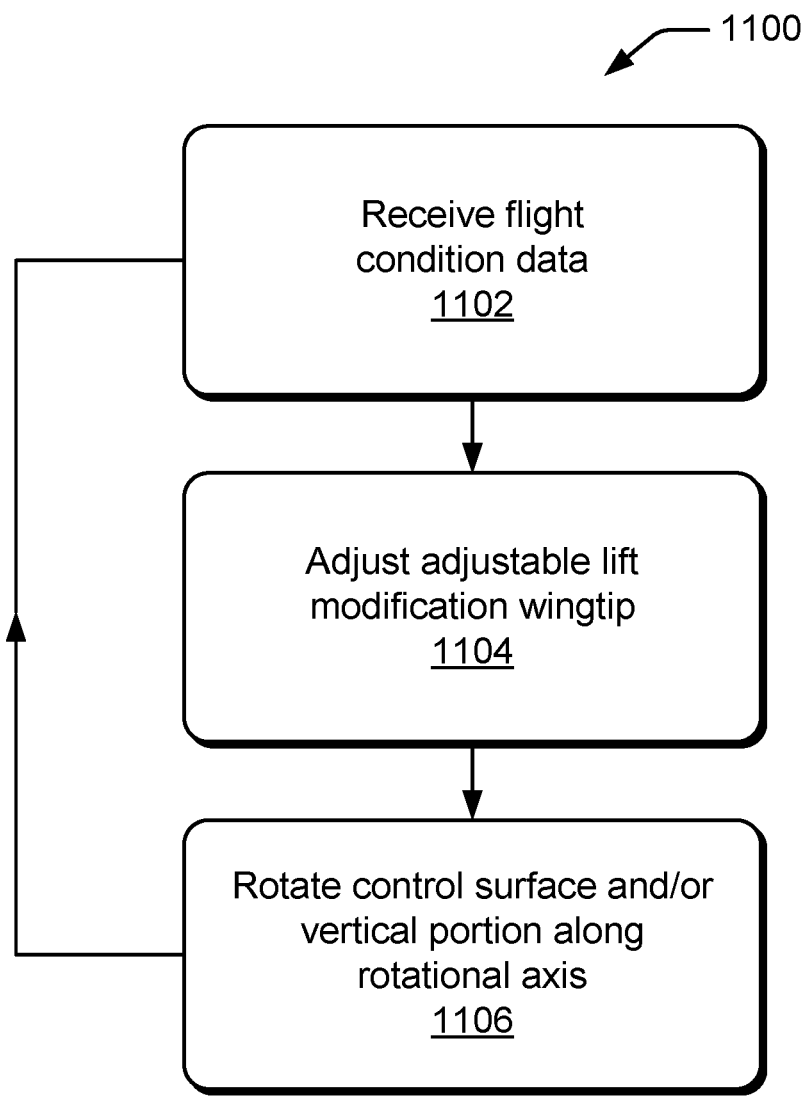
FIG. 11 depicts a flowchart illustrating operation of adjustable lift modification wingtips.

FIG. 11 is a flowchart of one illustrative method 1100 of operating adjustable lift modification wingtips. For ease of understanding, the method 1100 is described in the context of the configuration shown in FIGS. 1, 3, 5, 6A-C, and 8A-C. However, the method 1100 is not limited to performance using such a configuration and may be applicable to other aircraft and other types of wingtip devices.

In this particular implementation, the method 1100 begins at block 1102 in which a control system, such as control system 320, receives data from one or more sensors, such as sensors 318, located in or on the aircraft 310. The data received from the sensors may comprise flight condition data that may include, but is not limited to, altitude data, angle of attack data, airspeed data, attitude data, aircraft weight data, temperature data, humidity data, altitude data, pressure data, and/or turbulence data.

At block 1404, an adjustable lift modification wingtip may be adjusted. Adjustment of the adjustable lift modification wingtip 300 may be based in part on the data received at block 1102. For example, flight condition data is received as a signal and interpreted by control logic 328 using parameters 330. The control logic 328 may determine operation of the control surface(s) 306 and vertical portion 304, such as determining a position or positions to deploy the control surface(s) 312 and vertical portion 304. For example, the control logic 328 may determine that a control surface 806 should be deployed to angle 814 as shown in FIG. 8C and vertical portion 504 should be deployed to angle 606 as shown in FIG. 6C. Control logic 328 may generate a signal to cause the control surface and vertical portion to move.

At block 1106, the signal from control logic 328 is received by an actuator or controller, for example actuator 512 as shown in FIG. 6C. The actuator may then actuate and/or cause a control surface and vertical portion to deploy.

In various embodiments, method 1100 is repeated to provide adjustments of the adjustable lift modification wingtip over the course of a flight accounting for changes in the flight condition of the aircraft.

CONCLUSION

Although embodiments have been described in language specific to structural features and/or methodological acts, it is to be understood that the disclosure and appended claims are not necessarily limited to the specific features or acts described. Rather, the specific features and acts are disclosed as illustrative forms of implementing the embodiments. For example, the methodological acts need not be performed in the order or combinations described herein, and may be performed in any combination of one or more acts.

What is claimed is:

1. A winglet fixedly attachable to a baseline wing of an aircraft comprising:
    a horizontal portion comprising a control surface;
    an angled portion coupled to the horizontal portion and projecting at an upward angle from the horizontal portion, the angled portion comprising a cantilevered portion configured to move about an axis that is substantially parallel to the upward angle, the control surface and the angled portion which, when attached to the baseline wing of the aircraft increase wing efficiency at a flight condition; and
    a control system for controlling motion of the control surface and the angled portion configured to:
        deflect the control surface down and rotate a leading edge of the angled portion in to increase lift at a first flight condition; and
        deflect the control surface up and rotate the leading edge of the angled portion out to decrease lift at a second flight condition.

2. The winglet of claim 1, the control system for controlling motion of the control surface and the angled portion based at least in part on in-flight flight condition data.

3. The winglet of claim 2, the control system communicatively coupled to a sensor located on the aircraft and configured to receive a signal from the sensor located on the aircraft.

4. The winglet of claim 1, the control surface configured to deflect between 15 degrees up and 15 degrees down; and the angled portion configured to deflect between 4 degrees in and 4 degrees out.

5. The winglet of claim 2, the control system configured to control the control surface and angled portion independently of at least one of an auto-pilot or a fly-by-wire system of the aircraft.

6. The winglet of claim 2, the control system configured to control the control surface and angled portion in conjunction with at least one of an auto-pilot or a fly-by-wire system of the aircraft.

7. The winglet of claim 2, the sensor comprising one or more of angle-of-attack, airspeed, density, atmospheric conditions, or pressure.

8. A wingtip device fixedly attachable to a baseline wing of an aircraft comprising:
    an angled portion coupleable to an outboard portion of the baseline wing, the angled portion configured to fixedly attach to an outboard portion of the baseline wing such that the angled portion projects at an upward angle from the baseline wing, the angled portion comprising a cantilevered portion configured to move about an angled axis that is out of plane with the baseline wing and parallel to the upward angle of the angled portion, the angled portion which, when attached to the baseline wing of the aircraft, and a control surface of the baseline wing increase wing efficiency at a flight condition; and
    a control system for controlling motion of the control surface and angled portion configured to:
        deflect the control surface down and rotate a leading edge of the angled portion in to increase lift at a first flight condition; and
        deflect the control surface up and rotate the leading edge of the angled portion out to decrease lift at a second flight condition.

9. The wingtip device of claim 8, wherein the angled axis is substantially parallel to a spanwise portion of the angled portion.

10. The wingtip device of claim 8, the control surface of the baseline wing is located proximate to the wingtip device.

11. The wingtip device of claim 8, the control surface comprising at least one of an aileron, flaperon, flap, spoiler, spoileron, or controllable airflow modification device.

12. The wingtip device of claim 8, the control system for controlling motion of the control surface and angled portion based at least in part on in-flight flight condition data.

13. The wingtip device of claim 12, the control system communicatively coupled to a sensor located on the aircraft and configured to receive a signal from the sensor located on the aircraft.

14. The wingtip device of claim 8, the wingtip device comprising at least one of winglet, end-plate, spiroid, split winglet, fence, rake, or swallow tail.

15. A method comprising:
receiving in-flight flight condition data from a sensor located on an aircraft; and
adjusting a control surface and angled portion of a wingtip device attached to an outboard portion of a baseline wing of the aircraft based at least in part on the received in-flight flight condition data, the control surface located on a horizontal portion of the baseline wing of the aircraft, the angled portion comprising a cantilevered portion is coupled to and projects at an upward angle from the baseline wing, the cantilevered portion adjustable about an axis that is substantially parallel to the upward angle of the angled portion, the adjusting of the control surface and angled portion comprising:
rotating the control surface along a horizontal axis such that an edge of the control surface moves up or down in relation to the baseline wing and rotating the cantilevered portion about the axis that is substantially parallel to the upward angle of the angled such that an edge of the angled portion moves in or out in relationship to the baseline wing,
deflecting the control surface down and rotate a leading edge of the angled portion in to increase lift at a first flight condition; and
deflecting the control surface up and rotate the leading edge of the angled portion out to decrease lift at a second flight condition.

16. An aircraft comprising:
a fuselage;
a baseline wing, the baseline wing coupled to the fuselage at a first end of the baseline wing; and
a wing extension comprising:
a horizontal portion coupled to a second end of the baseline wing, such that the horizontal portion is outboard of the baseline wing, the horizontal portion comprising a control surface;
an angled portion coupled to the horizontal portion and projecting at an upward angle from the horizontal portion, the angled portion comprising a cantilevered portion configured to move about an axis that is substantially parallel to the upward angle, the control surface and the angled portion, the control surface and the angled portion adjustable in flight to increase wing efficiency at a flight condition; and
a control system for controlling motion of the control surface and angled portion configured to:
deflect the control surface down and rotate a leading edge of the angled portion in to increase lift at a first flight condition; and
deflect the control surface up and rotate the leading edge of the angled portion out to decrease lift at a second flight condition.

* * * * *